US012679062B2

(12) United States Patent
Wetsch

(10) Patent No.: US 12,679,062 B2
(45) Date of Patent: Jul. 14, 2026

(54) PACKAGING WITH MULTI-PLY WALLS

(71) Applicant: Pregis LLC, Chicago, IL (US)

(72) Inventor: Thomas D. Wetsch, Naples, FL (US)

(73) Assignee: Pregis LLC, Chicago, IL (US)

( * ) Notice: Subject to any disclaimer, the term of this patent is extended or adjusted under 35 U.S.C. 154(b) by 0 days.

(21) Appl. No.: 18/472,980

(22) Filed: Sep. 22, 2023

(65) Prior Publication Data

US 2024/0100800 A1 Mar. 28, 2024

Related U.S. Application Data

(60) Provisional application No. 63/484,473, filed on Feb. 10, 2023, provisional application No. 63/376,759, filed on Sep. 22, 2022.

(51) Int. Cl.

| | |
|---|---|
| ***B31B 70/62*** | (2017.01) |
| ***B31B 70/64*** | (2017.01) |
| ***B31B 155/00*** | (2017.01) |
| ***B31B 170/20*** | (2017.01) |

(52) U.S. Cl.
CPC ............ *B31B 70/62* (2017.08); *B31B 70/645* (2017.08); *B31B 2155/002* (2017.08); *B31B 2170/20* (2017.08)

(58) Field of Classification Search
CPC ... B31B 70/62; B31B 70/645; B31B 2170/20; B31B 2155/002
See application file for complete search history.

(56) References Cited

U.S. PATENT DOCUMENTS

| | | | | | |
|---|---|---|---|---|---|
| 2,013,086 | A * | 9/1935 | Baker | B31B 70/00 | 493/234 |
| 3,850,724 | A * | 11/1974 | Lehmacher | B29C 69/006 | 156/518 |
| 3,868,056 | A * | 2/1975 | Keren | B32B 29/02 | 206/521 |
| 3,955,750 | A * | 5/1976 | Huffman | B42D 5/025 | 400/37 |
| 4,011,798 | A * | 3/1977 | Bambara | B32B 3/02 | 493/240 |
| 4,193,499 | A * | 3/1980 | Lookholder | B65D 81/027 | 53/472 |
| 4,566,927 | A * | 1/1986 | Wood | B29C 66/91921 | 156/203 |
| 4,620,633 | A * | 11/1986 | Lookholder | B65D 81/03 | 53/472 |
| 5,503,611 | A * | 4/1996 | Richter | B65H 39/16 | 156/320 |
| 5,529,396 | A * | 6/1996 | Pryor | B65D 31/10 | 383/111 |

(Continued)

FOREIGN PATENT DOCUMENTS

| | | | |
|---|---|---|---|
| DE | 1097248 | B | 1/1961 |
| DE | 3426290 | A1 | 1/1986 |
| GB | 2074128 | A | 10/1981 |

*Primary Examiner* — Dariush Seif
(74) *Attorney, Agent, or Firm* — Fox Rothschild LLP

(57) ABSTRACT

Envelopes for holding one or more items include a first and a second flexible wall. The second wall overlies, and is affixed to the first flexible wall. The second flexible wall can include a plurality of overlying layers of paper affixed to each other so as to define an interlayer region within which at least two of the plurality of overlying layers of paper are not adhered to each other.

27 Claims, 15 Drawing Sheets

(56) References Cited

U.S. PATENT DOCUMENTS

| | | | | | |
|---|---|---|---|---|---|
| 5,687,841 | A * | 11/1997 | Phykitt | B65D 27/00 | 206/217 |
| 5,724,789 | A * | 3/1998 | Corella | B65B 9/023 | 53/553 |
| 11,801,981 | B2 | 10/2023 | Wetsch | | |
| 2001/0043763 | A1* | 11/2001 | Saad | B65D 31/04 | 383/111 |
| 2003/0116453 | A1* | 6/2003 | Russo | B32B 7/12 | 206/308.1 |
| 2004/0112785 | A1* | 6/2004 | Wittemer | B65D 75/30 | 206/534 |
| 2004/0265521 | A1* | 12/2004 | Marzano | B32B 27/32 | 428/35.2 |
| 2007/0047853 | A1* | 3/2007 | Sharp | B65D 31/02 | 383/106 |
| 2007/0140599 | A1* | 6/2007 | Dalgleish | B65D 31/142 | 383/100 |
| 2010/0092758 | A1* | 4/2010 | Slovencik | B65D 81/052 | 425/542 |
| 2010/0150479 | A1* | 6/2010 | Smith | B65D 33/2508 | 383/61.3 |
| 2011/0027507 | A1* | 2/2011 | Mileti | B31B 70/00 | 156/60 |
| 2011/0052106 | A1* | 3/2011 | Holmes | B65D 31/10 | 383/119 |
| 2011/0103720 | A1* | 5/2011 | De Muinck | B32B 27/08 | 156/182 |
| 2013/0047560 | A1* | 2/2013 | Wetsch | B32B 7/12 | 156/251 |
| 2013/0202229 | A1* | 8/2013 | Broering | B65D 33/00 | 383/75 |
| 2013/0303351 | A1* | 11/2013 | Fu | B29C 44/445 | 493/54 |
| 2022/0002069 | A1* | 1/2022 | Wetsch | B31B 70/62 | |
| 2022/0340336 | A1* | 10/2022 | Brauer | B65D 31/08 | |
| 2024/0100800 | A1* | 3/2024 | Wetsch | B31B 70/645 | |
| 2025/0108590 | A1* | 4/2025 | Goodrich | B32B 3/28 | |

* cited by examiner

PACKAGING WITH MULTI-PLY WALLS

CROSS REFERENCE TO RELATED APPLICATIONS

The present application claims the benefit under 35 U.S.C. § 119(e) of U.S. Provisional Application No. 63/484,473, filed Feb. 10, 2023, and U.S. Provisional Application No. 63/376,759, filed Sep. 22, 2022. The entire contents of these applications are incorporated herein by reference in their entireties.

FIELD

The present disclosure relates generally to packaging for holding items, for example, during shipping. More specifically, embodiments of the present disclosure relate to packaging materials that include one or more multi-ply or multi-layer walls.

BACKGROUND

The use of paper for mailers and other types of envelopes for shipping small to medium-sized items is increasing due to various advantages of paper in such applications. For example, unlike plastic films, most types of paper can easily be recycled. In some applications, however, paper may have less resistance to tearing than plastic films, which can adversely affect the ability of a paper envelope to remain intact and adequately retain its contents when dropped or otherwise mishandled during the shipping process.

SUMMARY

In one aspect of the disclosed technology, an envelope for holding an item includes a first flexible wall, and a second flexible wall overlying the first flexible wall and affixed to the first flexible wall about a containment border that encloses a plurality of sides of a containment region defined by the first and second flexible walls. The containment region is configured to contain the item. The second flexible wall includes at least two overlying layers of paper affixed to each other about an interlayer border that encloses a plurality of sides of an interlayer region defined by the at least two overlying layers of paper. The at least two overlying layers of paper are unadhered to each other within at least a portion of the interlayer region, and the interlayer region is empty so that the at least two overlying layers of paper abut each other over a majority of the interlayer region.

In another aspect of the disclosed technology, the interlayer region overlies more than about half of the containment region.

In another aspect of the disclosed technology, the interlayer region overlies more than about seventy-five percent of the containment region.

In another aspect of the disclosed technology, the interlayer region overlies a substantial entirety of the containment region.

In another aspect of the disclosed technology, the at least two overlying layers of paper are slidable with respect to each other over a majority of the interlayer region.

In another aspect of the disclosed technology, the containment region is accessible by way of an opening defined by the first and second flexible walls, and the envelope further includes a bonding element disposed on at least one of the first and second flexible walls and configured to affix the first flexible wall to the second flexible wall to close the opening.

In another aspect of the disclosed technology, the opening is defined by a slit formed in the plurality of overlying layers of paper of the second flexible wall.

In another aspect of the disclosed technology, the slit is directly adjacent to the bonding element.

In another aspect of the disclosed technology, the bonding element is a heat seal material.

In another aspect of the disclosed technology, the bonding element is an adhesive material.

In another aspect of the disclosed technology, the slit is a first slit, and the opening is further defined by a second slit formed in the first flexible wall.

In another aspect of the disclosed technology, the first flexible wall includes at least two overlying layers of paper affixed to each other about an interlayer border that encloses a plurality of sides of an interlayer region defined by the at least two overlying layers of paper of the first flexible wall.

In another aspect of the disclosed technology, the first flexible wall includes at least one inter-ply seal configured to affix the at least two overlying layers of paper affixed to each other; and the at least one inter-ply seal defines at least a portion of the interlayer border.

In another aspect of the disclosed technology, the envelope further includes at least one inter-wall seal configured to affix the first and second flexible walls to each other. The at least one inter-wall seal defines at least a portion of the containment border.

In another aspect of the disclosed technology, the at least one inter-ply seal overlies the at least one inter-wall seal.

In another aspect of the disclosed technology, the at least one inter-wall seal is a first inter-wall seal, the envelope further includes a second inter-wall seal, and the first inter-wall seal extends along respective first sides of the first and second flexible walls. The second inter-wall seal extends along respective second sides of the first and second flexible walls, the containment region is accessible by way of an opening defined by the first and second flexible walls, and the opening extends between the first and second inter-wall seals.

In another aspect of the disclosed technology, the second flexible wall includes a first portion that adjoins the first flexible wall along a first fold line.

In another aspect of the disclosed technology, the second flexible wall further includes a second portion that adjoins the first flexible wall along a second fold line; and an end of the second portion overlaps, and is attached to an end of the first portion.

In another aspect of the disclosed technology, the second flexible wall includes at least a first, a second, and a third of the overlying layers of paper; the interlayer region is disposed between the first and second layers; and the envelope further includes an expandable material disposed between the second and third layers.

In another aspect of the disclosed technology, the envelope further includes a gusset adjoining the first and second flexible walls.

In another aspect of the disclosed technology, a web stock includes a plurality of the envelopes as described above, and each of the envelopes adjoins an adjacent one of the envelopes.

In another aspect of the disclosed technology, each of the envelopes adjoins the adjacent one of the envelopes along a region of weakness between the adjacent envelopes.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
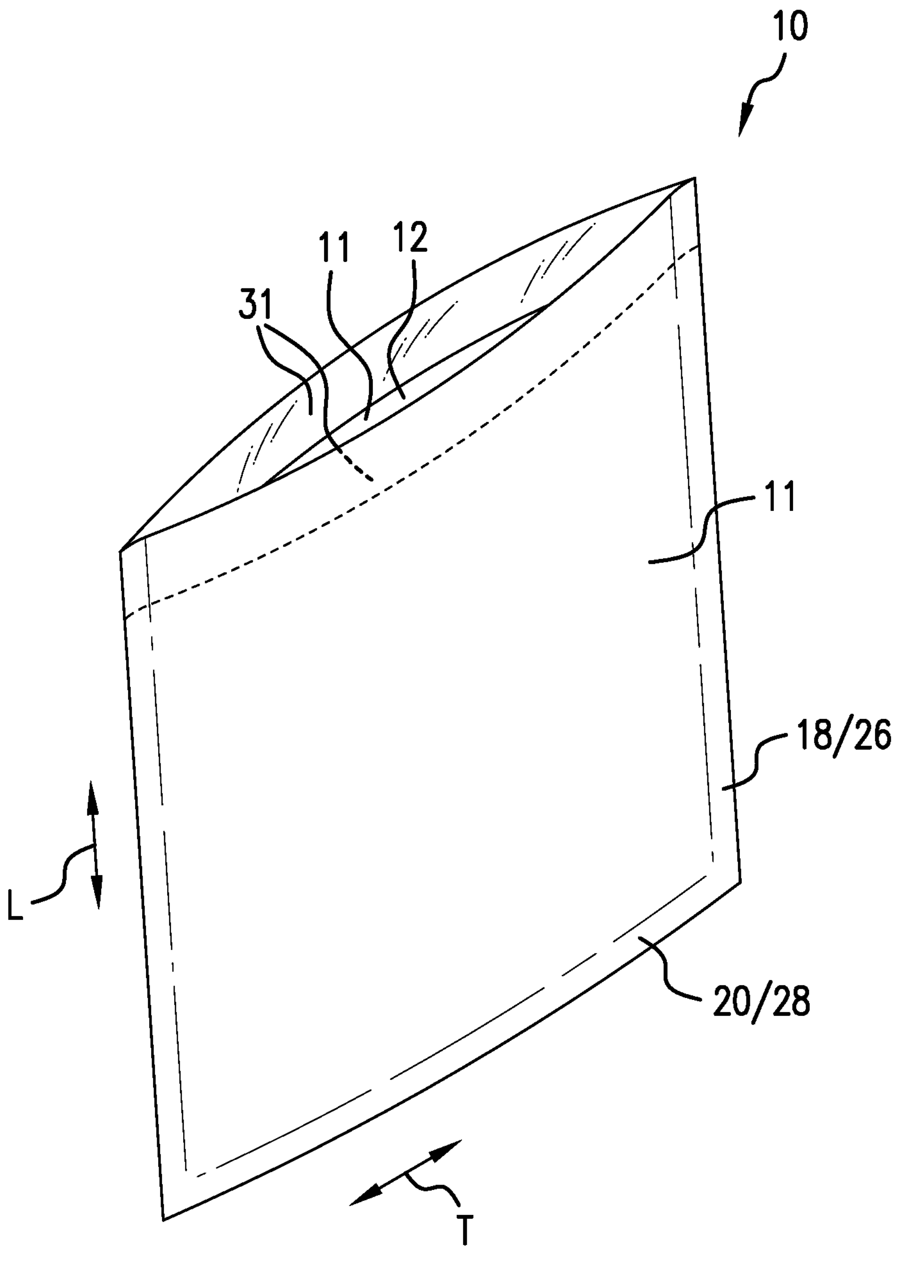
FIG. 1 is a top-side perspective view of an envelope having multi-ply walls.

The inventive concepts are described with reference to the attached figures, wherein like reference numerals represent like parts and assemblies throughout the several views. The figures are not drawn to scale and are provided merely to illustrate the instant inventive concepts. The figures do not limit the scope of the present disclosure or the appended claims. Several aspects of the inventive concepts are described below with reference to example applications for illustration. It should be understood that numerous specific details, relationships, and methods are set forth to provide a full understanding of the inventive concepts. One having ordinary skill in the relevant art, however, will readily recognize that the inventive concepts can be practiced without one or more of the specific details or with other methods. In other instances, well-known structures or operations are not shown in detail to avoid obscuring the inventive concepts.

FIGS. 1-4 depict an embodiment of an envelope 10. The envelope 10 is configured to contain and hold an item, typically enclosing the item, while the item is being mailed or shipped, or otherwise needs to be packaged in a closed container. The term "envelope," as used herein, is intended to encompass, without being limited to, flat shipping containers, including mailers, having sufficient flexibility so as to expand and bend around an item upon insertion of the item into a pocket within the envelope; and in which the sidewalls or thickness of the container are substantially smaller than, e.g., less than one-tenth of, the width and/or height of the container.

Figure 4:
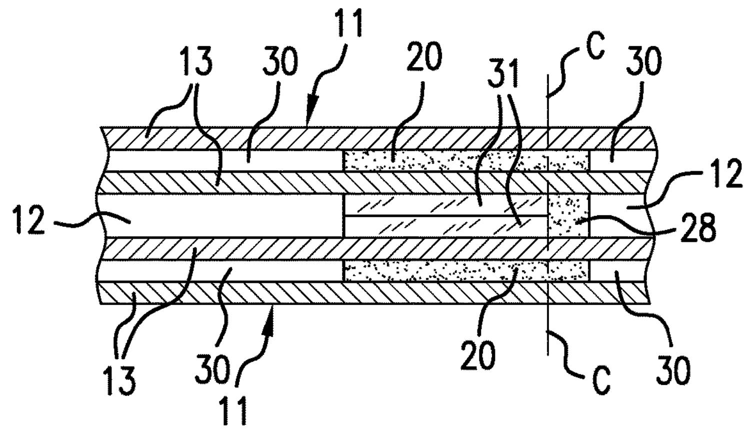
FIG. 4 is a magnified cross-sectional view taken through the plane "IV-IV" of FIG. 3.

Referring to FIGS. 1 and 4, the envelope 10 comprises two flexible walls 11 joined in the below-described manner. The walls 11 define a containment region in the form of an envelope pocket 12. The envelope pocket 12 is configured to receive and hold an item (not shown). Each wall 11 includes two layers, with each layer formed by a ply 13 of a suitable material such as paper. In alternative embodiments, one of the walls 11 can be a single-layer wall formed from a single ply 13, and the other wall 11 can be a two-layer wall formed from two of the plies 13. In other alternative embodiments, one or both of the plies 13 can be formed from a plastic film.

Referring to FIG. 1, the plies 13 of each wall 11 are affixed to each other by two longitudinal inter-ply seals 18, and two transverse inter-ply seals 20. The longitudinal and transverse inter-ply seals 18, 20 are formed from a bonding element in the form of an adhesive material 24 visible in FIG. 2. The longitudinal and transverse directions are denoted in FIGS. 1-3 by the respective arrows "L" and "T."

The adhesive material 24 can be a cold glue. Other types of adhesive materials, and other types of bonding elements can be used in lieu of a cold glue in alternative embodiments. For example, cohesive and heat seal materials can be used as the bonding element in alternative embodiments.

Each longitudinal inter-ply seal 18 is located along a corresponding longitudinal edge of the wall 11, and extends substantially in a longitudinal direction of the wall 11. Each longitudinal inter-ply seal 18 can be offset from the corresponding edge of the wall 11 in alternative embodiments. The longitudinal inter-ply seals 18 are continuous. The longitudinal inter-ply seals 18 can be non-continuous in alternative embodiments.

The transverse inter-ply seals 20 are located along the lower and upper edges of the wall 11, and extend substantially in a transverse direction of the wall 11, between the longitudinal inter-ply seals 18. The transverse inter-ply seals 20 can be offset from the lower and upper edges of the wall 11 in alternative embodiments. The transverse inter-ply seals 20 are continuous. The transverse inter-ply seals 20 can be non-continuous in alternative embodiments.

Figure 2:
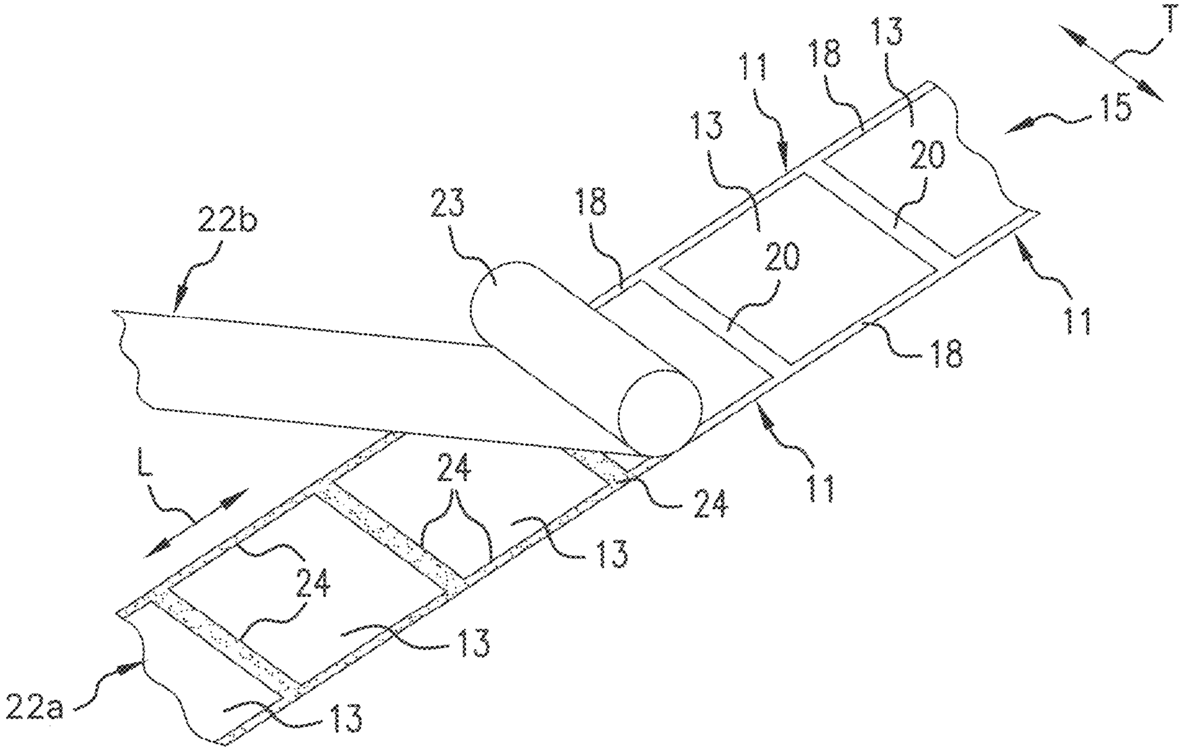
FIG. 2 depicts the formation of a continuous web of walls used to form the envelope shown in FIG. 1.

FIG. 2 depicts the manufacture of a web 15 from which the envelope 10 may be formed. The web 15 comprises a continuous series of the walls 11, with each wall 11 interconnected to its adjacent walls 11 within the web 15. As discussed below, two of the webs 15 are joined to each other to form a web stock 16 of interconnected envelopes 10. Individual envelopes 10 subsequently can be separated from the web stock 16 by hand, or by automated means.

FIG. 2 depicts the formation of the web 15 using an automated device. The web 15 is formed from two substantially identical strips of paper 22*a*, 22*b*. The paper strips 22*a*, 22*b*, when joined in the following manner, form the two plies 13 of each wall 11.

The adhesive material 24 is deposited on the paper strip 22*a*, at locations corresponding to the desired locations of the longitudinal and transverse inter-ply seals 18, 20. The paper strip 22*b*, without adhesive, is positioned above, and is aligned with the paper strip 22*a*.

A roller 23 of the automated device then presses the paper strips 22*a*, 22*b* together, so that the adhesive material 24 on the lower paper strip 22*a* contacts the other paper strip 22*b*, forming the inter-ply seals 18, 20 and securing the paper strips 22*a*, 22*b* to each other, resulting in the continuous web 15 of two-ply walls 11. In alternative embodiments, the adhesive material 24 can be deposited at corresponding locations on both of the paper strips 22*a*, 22*b* before the paper strips 22*a*, 22*b* are joined to form the web 15.

The above description of the formation of the web 15 is presented for illustrative purposes only. The web 15 can be formed in other ways.

Examples of paper suitable for use in forming the plies 13 include, but are not limited to, kraft paper, fiberboard, pulp-based paper, recycled paper, newsprint, paperboard, etc. In some applications, the paper may be an extensible paper configured to elongate, or stretch, by up to a predetermined percentage of its original (unstretched) length, without tearing. Parameters of the paper, including its dimensions and weight, may be varied depending upon the desired application.

One, or both of the plies 13 also can include one or more functional layers positioned thereon. Examples of functional layers can include, but are not limited to, waterproofing layers configured to reduce the permeability of water therethrough, an airtight layer configured to reduce the permeability of air therethrough, other suitable material layers, and/or a combination thereof.

The longitudinal and transverse inter-ply seals 18, 20 border, and help to define an interlayer region in the form of an inter-ply space 30, located between the two plies 13 of each wall 11. The inter-ply space 30 is visible in FIG. 4. One or both of the plies 13 can be air permeable, so that the inter-ply space 30 is in fluid communication with the space outside of the two plies 13. In such embodiments, air or other fluids can move into and out of the inter-ply space 30, and are not trapped therein. The plies 13 can be non-permeable to air in alternative embodiments.

The two plies 13 of each wall 11 face each other across the inter-ply space 30, but are not adhered to each other in the inter-ply space 30. Also, the inter-ply space 30 is sufficiently empty such that the plies 13 can abut and otherwise contact each other within the inter-ply space 30, and can slide in relation to each other within the inter-ply space 30. For example, the inter-ply space 30 can be completely empty, i.e., the inter-ply space 30 can be completely devoid of any filler or other material.

In alternative embodiments, the inter-ply space 30 can be partially filled with a cushioning or padding material, a thermally-insulating material, or other types of expandable and non-expandable materials. For example, in some alternative embodiments, up to about ten percent of the inter-ply space 30 can be filled with such materials. In other alternative embodiments, up to about 25 percent of the inter-ply space 30 can be filled with such materials. In other alternative embodiments, up to about 50 percent of the inter-ply space 30 can be filled with such materials. In other alternative embodiments, up to about 75 percent of the inter-ply space 30 can be filled with such materials The multi-ply construction of the walls 11, and the absence of a fixed mechanical connection between the plies 13 within the inter-ply space 30, can enhance the ability of the envelope 10 to withstand tearing or puncturing. More specifically, in the event of a tear or puncture in one of the plies 13, the underlying envelope pocket 12 of the envelope 10, and the item residing in the envelope pocket 12, will remain enclosed due to the presence of the intact, i.e., undamaged, ply 13.

Also, although the tear or puncture may propagate along the damaged ply 13, it will not necessarily propagate to the intact ply 13 because the longitudinal inter-ply seals 18 and/or the transverse inter-ply seals 20 will act as a stop that prevents the tear or puncture from propagating past, or through the longitudinal inter-ply seals 18 or the transverse inter-ply seals 20. Thus, the envelope pocket 12 will remain intact and the item held therein will remain in the envelope pocket 12 even when the tear or puncture propagates across the most or all of the damaged ply 13.

In addition, the use of two plies 13 can facilitate the use of lower basis-weight paper than otherwise would be possible, providing the walls 11 with greater flexibility than they otherwise might have while maintaining the strength and tear resistance needed for a particular application. For example, the plies 13 can be formed from relatively low basis-weight paper, such as two plies of 30 to 45-pound paper, in lieu of a single ply of 90-pound paper.

Each wall 11 has one inter-ply space 30 defined therein. In alternative embodiments, one or both of the walls 11 can have more than one inter-ply space 30 defined therein. For example, an alternative embodiment can have two inter-ply spaces 30 defined by three longitudinal inter-ply seals 18. Two of the longitudinal inter-ply seals 18 can be located along the longitudinal edges of wall, as in the wall 11. The third longitudinal inter-ply seal 18 can be located at the approximate mid-point of the wall, i.e., about halfway between the longitudinal edges of wall, thereby dividing the space between the plies 13 into two inter-ply spaces 30.

In other alternative embodiments, the wall 11 can have more than three longitudinal inter-ply seals 18, so that more than three inter-ply spaces 30 are defined within the wall 11. Other alternative embodiments can have more than two transverse inter-ply seals 20, to similarly divide the space between the plies 13 into more than one inter-ply space 30. In other alternative embodiments, one or more of the inter-ply seals can extend in a direction other than the longitudinal and transverse directions. In other alternative embodiments, a small band or dot of adhesive located between the plies 13, and inward of the longitudinal, lower, and upper edges of the wall 11, can be used to further adhere the plies 13 to each other while still permitting some relative movement between the plies 13.

Referring to FIGS. 1 and 4, the walls 11 of each envelope 10 are affixed to each other by two longitudinal inter-wall seals 26, and one transverse inter-wall seal 28. The longitudinal and transverse inter-wall seals 26, 28 are formed from a bonding element in the form of an adhesive material 34 visible in FIG. 3. The adhesive material 34 can be a cold glue. Other types of adhesive materials, and other types of bonding elements can be used in lieu of a cold glue in alternative embodiments.

Each longitudinal inter-wall seal 26 is located along a corresponding longitudinal edge of the envelope 10, and extends substantially in a longitudinal direction of the envelope 10. Each longitudinal inter-wall seal 26 can be offset from the corresponding edge of the envelope 10 in alternative embodiments. The longitudinal inter-wall seals 26 are continuous. The longitudinal inter-wall seals 26 can be non-continuous in alternative embodiments.

The transverse inter-wall seal 28 is located along the lower or bottom edge of the envelope 10, and extends substantially in a transverse direction of the envelope 10, between the longitudinal inter-wall seals 26. The transverse inter-wall seal 28 can be offset from the lower edge of the envelope 10 in alternative embodiments. The transverse inter-wall seal 28 is continuous. The transverse inter-wall seal 28 can be non-continuous in alternative embodiments.

Figure 3:
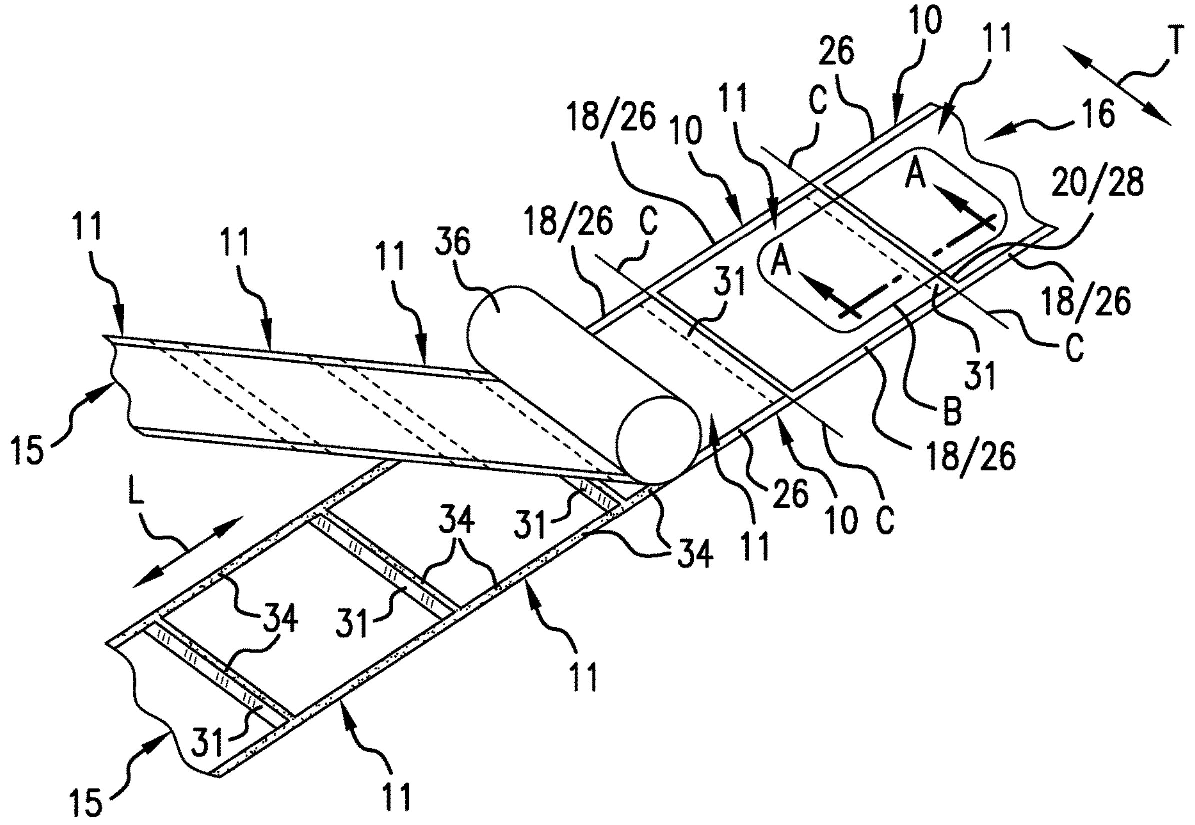
FIG. 3 depicts the formation of a continuous web stock of the envelopes shown in FIG. 1, from the web of walls shown in FIG. 2.

Referring to FIGS. 1, 3, and 4, a bonding element in the form of a band of heat seal material 31 is disposed on the inwardly-facing surface of each inner ply 13 of each wall 11, so that the bands of heat seal material 31 oppose each other. The heat seal material 31 is located along, and extends from the upper edge of each wall 11. The heat seal material 31 can be offset from the upper edge of the wall 11 in alternative embodiments. The heat seal material 31 can be a continuous band extending between the longitudinal inter-wall seals 26. The heat seal material 31 can be non-continuous in alternative embodiments. Also, the heat seal material 31 can be positioned on only one of the walls 11 in alternative embodiments. Other types of bonding elements can be used in lieu of the heat seal material 31 in other alternative embodiments. For example, an adhesive material covered by a release strip, or a hot-melt adhesive can be used in lieu of the heat seal material 31.

The envelope pocket 12 is depicted in FIGS. 1 and 4. The envelope pocket 12 is defined by the opposing interior surfaces of the walls 11, and is bordered by the longitudinal and transverse inter-wall seals 26, 28 such that the longitudinal and transverse inter-wall seals 26, 28 form a containment border for the item to be packaged within the envelope 10.

Alternative embodiments can include more than two longitudinal inter-wall seals 26 and/or more than two transverse inter-wall seals 28 that define multiple pockets 12 within the envelope 10.

The inter-ply space 30 overlies a substantial entirety of the envelope pocket 12. In alternative embodiments, the inter-ply space 30 can overlie more than about seventy-five percent of the envelope pocket 12. In other alternative embodiments, the inter-ply space 30 can overlie more than about half of the envelope pocket 12.

Due to the flexibility of the paper walls 11, the envelope 10 can be stored and shipped in a substantially flat, compact configuration in which the envelope pocket 12 has minimal, or substantially zero volume. When the user desires to load an item into the envelope 10, the user can expand the envelope pocket 12 by separating or pulling apart the walls 11 at or near the top of the envelope pocket 12, and inserting the item be packaged between the walls 11. Once the item has been placed in the envelope 10, the heat seal material 31 on the walls 11 can be activated, i.e., heated and pressed together, so that the opposing bands of heat seal material 31, upon cooling, form a pocket closure. The pocket closure closes and seals the open end of the envelope pocket 12, so that the packaged item is retained within the envelope pocket 12.

In alternative embodiments, a single band of cold adhesive covered by a release strip, two opposing bands of cold adhesive each covered by respective release strip, or other types of adhesive can be used in lieu of the heat seal material 31 to seal the opening to the envelope pocket 12.

FIG. 3 depicts two of the webs 15 of two-ply walls 11 shown in FIG. 2, being joined together to form the continuous web stock 16 of the envelopes 10, using another automated device. For purposes of illustration and explanation, the two webs 15 are referred to as webs 15*a* and 15*b*.

The longitudinal inter-wall seals 26 and the transverse inter-wall seal 28 can be formed from a sealing material, such as the adhesive material 34, deposited on one side of the web 15*a*. As shown in FIG. 3, the adhesive material 34 has been deposited on the web 15*a* at locations corresponding to the desired locations of the longitudinal and transverse inter-wall seals 26, 28. The heat seal material 31 also is deposited on the web 15*a*. The web 15*b*, without any adhesive other than the heat seal material 31, is positioned above, and is aligned with the web 15*a*. A roller 36 of the automated device presses the webs 15*a*, 15*b* together, so that the adhesive material 34 on the web 15*a* adheres to the opposing surface of the web 15*b*, forming the longitudinal and transverse inter-wall seals 26, 28 and securing the webs 15*a*, 15*b* to each other. This results in the continuous web stock 16 of envelopes 10 depicted in FIG. 3.

In alternative embodiments, the adhesive material 34 can be deposited at opposing locations on both of the webs 15*a*, 15*b* before the webs 15*a*, 15*b* are joined to form the web stock 16.

Individual envelopes 10 can be separated from the web stock 16 by cutting, severing, or tearing the envelope 10 from the web stock 16, with the separation being performed between the heat seal material 31 and the transverse inter-wall seal 28 bordering the heat seal material 31. The line of separation of the envelope 10 from the remainder of the web stock 16 is denoted in FIG. 3 by the line "C."

Features for weakening the web stock 16 along line of separation C may be provided, to make it easier to separate the individual envelopes 10 from the web stock 16 without a need to cut or otherwise sever the envelope 10. For example, a region of weakness corresponding to the line of separation C can be provided by perforations, scoring, or other suitable technique for weakening the material along the line of separation C. The region of weakness can extend across a portion, or an entirety of the line of separation C. Alternative embodiments can be constructed without a region of weakness. In such applications, the envelope 10 can be separated from the web stock 16 by cutting or otherwise severing the envelope 10 from the web stock 16 using an automated or manual cutting means.

In FIG. 4, an individual envelope 10 is shown before it has been separated from the web stock 16 of envelopes 10. As can be seen in this figure, the transverse inter-ply seals 20 align with, or overlie, the transverse inter-wall seal 28 and the heat seal material 31. In alternative embodiments, the transverse inter-ply seals 20 can be offset from the transverse inter-wall seal 28 and the heat seal material 31 in the longitudinal direction of the web stock 16.

As noted above, the individual envelopes 10 are separated from the web stock 16 by cutting or otherwise severing the web stock 16 in a transverse direction, along the line "C" denoted in FIGS. 3 and 4. The line of separation C extends between the heat seal material 31 and the adjacent transverse inter-wall seal 28. The line of separation C also extends through the transverse inter-ply seal 20 of each wall 11. Thus, once the envelope 10 has been separated from the web stock 16, the heat seal material 31 and the overlying portions of each wall 11, including the overlying portion of the transverse inter-ply seal 20, form the top of the newly-separated envelope 10. The transverse inter-wall seal 28, the remaining portion of the transverse inter-ply seal 20, and the overlying portion of the walls 11, form the bottom of the adjacent envelope 10, which is still attached to the web stock 16.

Because the heat seal material 31 on the newly-separated envelope 10 has not yet been activated, the opposing bands of heat seal material 31, and the overlying portion of the walls 11, can be spread apart to open the envelope 10 and allow an item to be placed within the envelope pocket 12. As discussed above, once the item has been placed in the envelope pocket 12, the heat seal material 31 can be heated and pressed together to form the pocket closure, thereby sealing the item inside of the envelope pocket 12.

Figure 4A:
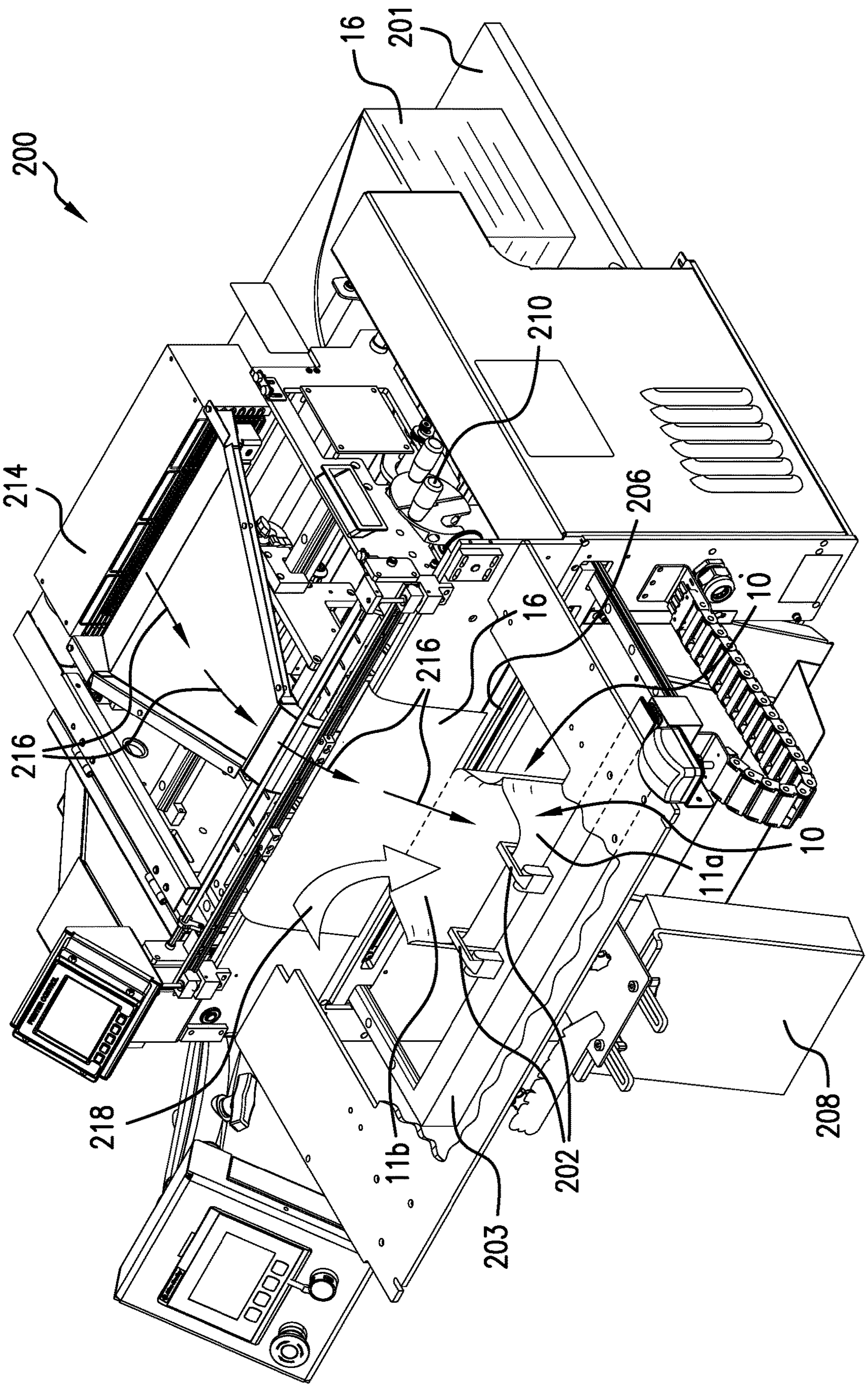
FIG. 4A is a perspective view of a bagging machine configured for use with the envelope shown in FIG. 1.

The envelopes 10 can be loaded, sealed, and separated from the web stock 16 by a bagging machine 200 depicted in FIG. 4A. The bagging machine 200 is described for illustrative purposes only. The envelopes 10 can be loaded, sealed, and separated from the web stock 16 manually, and by other automated means in the alternative.

The web stock 16 is fed into the bagging machine 200 in an unexpanded, high-density configuration. For example, as shown in FIG. 4A, the web stock 16 can supplied in a fanfold supply configuration, and can be held on a shelf 201 mounted on the supply side of the bagging machine 200. The web stock 16 can supplied in other suitable configurations, such as a roll.

The bagging machine 200 incudes fingers 202 that are configured to open the envelope 10 to provide access to the envelope pocket 12, so that an item to be packaged can be loaded into the envelope 10. For purposes of explanation, the outwardly and inwardly facing walls 11 of the envelope 10 are designated 11*a* and 11*b*, respectively, in FIG. 4A.

The fingers 202 are configured to grasp and pinch an upper portion of the outwardly-facing wall 11*a*. The fingers 202 are mounted on an articulating jaw 203 that can move outwardly and inwardly, i.e., away from and toward the web stock 16 from the perspective of FIG. 4A.

The fingers 202 initially grasp and pinch the wall 11*a* when the articulating jaw 203 is in its inward position, so that outward movement of the articulating jaw 203 and the attached fingers 202 pulls the wall 11*a* away from the wall 11*b* to form the opening at the top of the envelope 10. As can be seen in FIG. 4A, the outward movement of the wall 11*a* causes some of the perforations along the line of separation C to break, to accommodate the resulting expansion of the envelope 10.

The bagging machine 200 can include an air blower 214 configured to direct pressurized air at the top of the envelope 10 as denoted by the arrows 216, to aid in separating the walls 11*a*, 11*b*. Once the opening to the envelope pocket 12 has been formed, the item to be packaged can be loaded into the envelope pocket 12 manually, or by automated machinery, as denoted by the arrow 218.

The bagging machine further includes a heat sealer/cutter 206. After the item has been loaded into the envelope pocket 12, the articulating jaw 203 moves the outwardly-facing wall 11*a*, which is still being grasped and pinched by the fingers 202, inwardly, toward the wall 11*b*.

The inward movement of the articulating jaw 203 and the wall 11*a* eventually causes the walls 11*a*, 11*b* to become sandwiched between the articulating jaw 203 and the heat sealer/cutter 206. The heat sealer/cutter 206 heats, and applies pressure to the heat seal material 31 on the walls 11*a*, 11*b*, thereby forming the pocket closure that seals the envelope pocket 12 and prevents the packaged item from exiting the envelope pocket 12.

The bagging machine 200 can be equipped with a pad 208 that is mounted on, and moves with the articulating jaw 203. The pad 208 is configured to compress or squeeze the envelope 10 as the articulating jaw 203 moves inward, to help drive air out of the envelope pocket 12 before the envelope pocket 12 is sealed. The bagging machine 200 also can include a label printer 210 configured to print a label, and affix the label to the envelope 10.

After the envelope 10 has been loaded and sealed, the heat sealer/cutter 206 separates the envelope from the web stock 16 along the line of separation C. The separation can be achieved by a suitable means such as cutting, the focused application of heat along the line of separation, pulling the web stock 16 away from the envelope 10 while the envelope 10 is being held between the articulating jaw 203 and the heat sealer/cutter 206, etc. Once the loaded envelope 10 is separated from the web stock 16, the envelope 10 can drop onto a conveyor (not shown) or other means for transporting or holding the envelope 10.

As described above, the adhesive materials 24, 34 are deposited in patterns at locations on the paper strips 22*a*, 22*b* and the webs 15 corresponding to the respective locations of the longitudinal inter-ply seals 18, the transverse inter-ply seals 20, the longitudinal inter-wall seals 26, and the transverse inter-wall seals 28. Alternatively, one or both of the adhesive materials 24, 34 can be applied to the respective paper strips 22*a*, 22*b* and/or webs 15 by flood coating, followed by activation, e.g., the application of heat and/or pressure, at selected locations on the paper strips 22*a*, 22*b* and/or the webs 15. In other alternative embodiments, a web stock of envelopes can be formed by C-folding a single web 15.

The bonding elements, e.g., the adhesive materials 24, 34, can be applied directly to the exposed surfaces of the paper strips 22*a*, 22*b* or the webs 15 by suitable known methods. Alternatively, the bonding elements can be applied on a tape, such as a double-sided tape, or by other suitable methods.

An adhesive can include a bonding material that adheres to other types of surfaces. The adhesive can stick to an opposing surface without relying on the opposing surface having the same or a complimentary material for the stickage to take place to form a connection between the two ply surfaces.

Examples of suitable adhesives include liquid adhesives and pressure sensitive adhesives. Pressure sensitive adhesives can be selected that stick after applying a slight, initial, external pressure to create the bond. Examples of these include water-based, acrylic, pressure sensitive adhesives, similar to what is applied to packaging tape, which material holds two surfaces together solely by surface contact, often upon a slight initial external pressure. Other examples may include dry adhesives, which typically require no activation with water, solvent or heat, and firmly adhere to many dissimilar surfaces.

Pressure sensitive adhesives can be selected that are aggressive and/or permanently tacky at room temperature. Pressure sensitive adhesive application and use can be automated. When used in assembly, pressure sensitive adhesives that do not require setup or long curing times can be used to save time compared to using typical liquid adhesives. Adhesion is preferably immediate with pressure sensitive adhesives, allowing manufacturing procedures to continue uninterrupted, which can result in significant time and labor savings. Examples of water based, acrylic, pressure sensitive adhesives include those known as RHOPLEX N-1031 Emulsion, RHOPLEX N-580 Emulsion, and RHOPLEX N-619 Emulsion. Other emulsion polymers or acrylic polymer blend adhesives are also known, and other suitable types of adhesives and/or contact adhesives can be used.

A cohesive material includes a bonding material that causes one surface to stick to an opposing surface by coming into contact with the same or a complimentary cohesive substance to form the bond between the two surfaces. Cohesives do not stick to other substances sufficiently to adhere to those other substances, or in some cases stick very weakly compared to the bond they form from sticking to each other.

A cohesive can be a pressure sensitive cohesive, in which pressure is required to activate the bond. Examples of a suitable cohesive materials include natural and synthetic latex-based cohesives. The cohesive material in some embodiments is applied as a liquid to the appropriate portion of the material being adhered, and in others is applied in other known forms. Some types of cohesives, such as ones made with latex, are mixed with water without additional adhesives to bond to the respective, non-cohesive, portion of the protective packaging material, and upon drying remain stuck to the exposed surface material to which is has been applied. In some embodiments, the cohesive material can be mixed with an adhesive, often applied as a liquid, onto the material. The adhesive can be selected so that after applying the cohesive and adhesive mixture onto the material, the adhesive evaporates, leaving the cohesive bonded to the non-cohesive material.

A heat seal may be formed by sealing one thermoplastic to the same or a similar thermoplastic. For example, where two plastic films are to be sealed or otherwise affixed to each other, heat and pressure are applied to the areas on the films at which the seals are to be formed, with the heat and pressure being sufficient to locally weld the films together in those areas.

A heat seal can be formed between two paper substrates by applying a heat seal material to one or both the substrates. At the time the substrates are to be affixed, the heat seal material is subject to heat and pressure sufficient to weld the heat seal material to the substrates, thereby fixing the substrates to each other.

Hot-melt adhesives are thermoplastic polymers that are solid at room temperature, become molten when heated to a temperature above their softening point, and resolidify by loss of heat, increasing in strength as they resolidify. Most hot-melt adhesives, upon melting into a molten state and re-solidifying, do not undergo any chemical reaction such as cross-linking or removal of a carrier, e.g., evaporation of water. Thus, hot-melt adhesives typically can be re-activated, i.e., re-melted and re-solidified, after initially being applied to a substrate.

The above-noted description and features of the envelope 10, unless otherwise noted, apply equally to the following embodiments.

Figure 5:
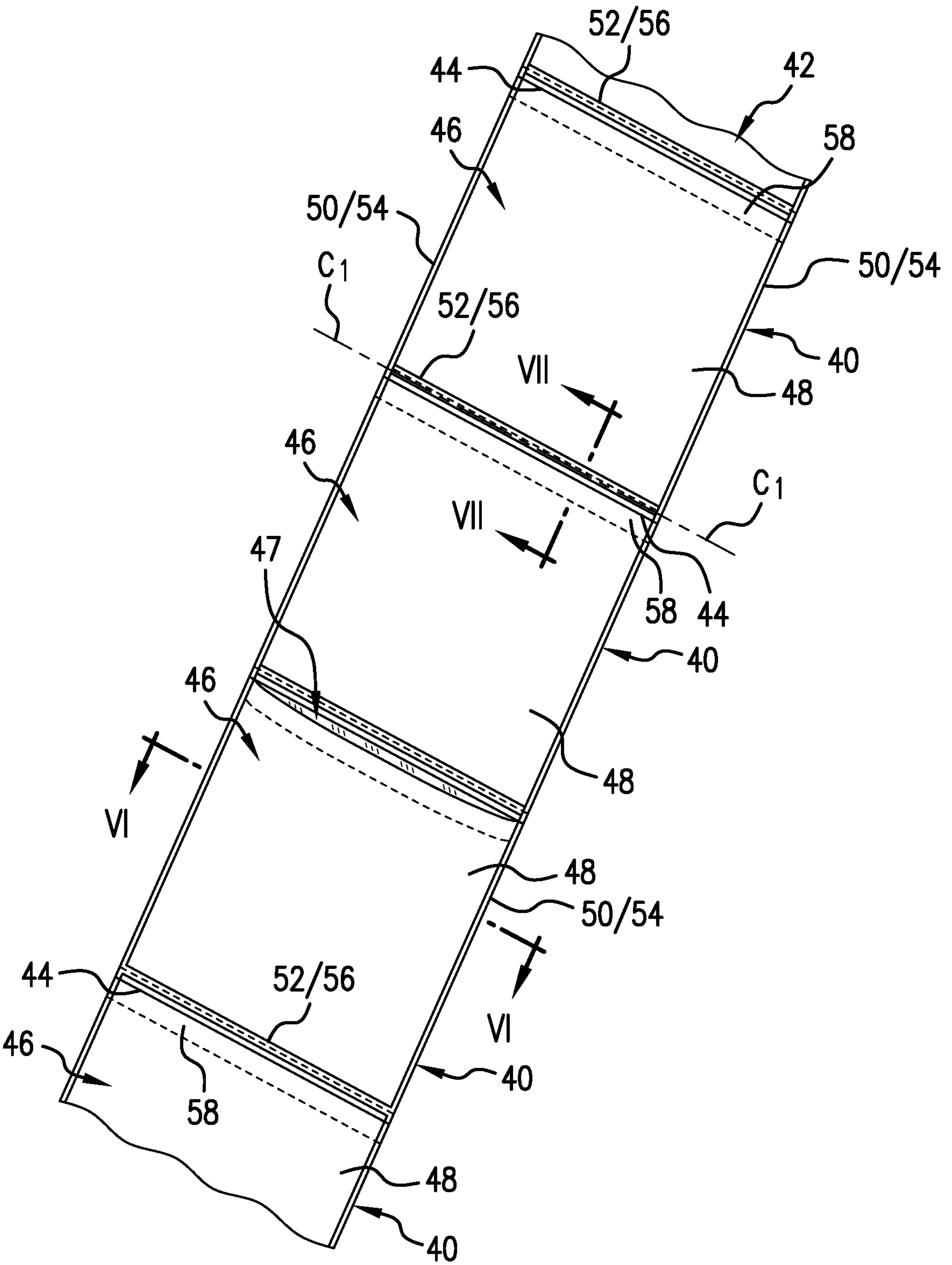
FIG. 5 depicts a continuous web stock of another embodiment of the envelope shown in FIG. 1.
Figure 6:
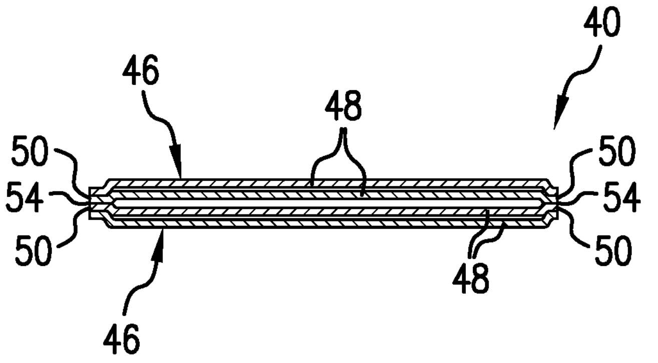
FIG. 6 is a cross-sectional view taken through the plane "VI-VI" of FIG. 5.
Figure 7:
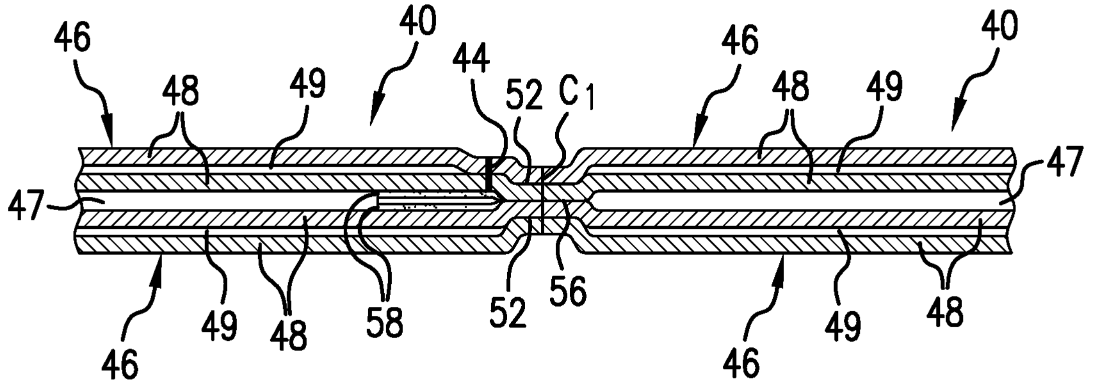
FIG. 7 is a magnified cross-sectional view through the plane "VII-VII" of FIG. 5.

FIGS. 5-7 depict an alternative embodiment in the form of an envelope 40. FIG. 5 shows a web stock 42 of adjoining envelopes 40. The envelopes 40 are similar to, and are formed in a manner similar to the envelopes 10, with the exception that each envelope 40 has a slit 44 extending transversely across one wall 46 of the envelope 40, to provide access to an internal containment area in a form of a envelope pocket 47. More specifically, the envelope 40 includes two of the walls 46. Each wall 46 comprises two plies 48 of a paper material. The slit 44 is formed in both plies 48 of the associated wall 46, as can be seen in FIG. 7.

The plies 48 of each wall 46 are joined by longitudinal inter-ply seals 50 located at or near the sides of the wall 46 and depicted in FIG. 6, and by transverse inter-ply seals 52 located at the top and bottom of each wall 46 and depicted in in FIG. 7. The longitudinal inter-ply seals 50 and the transverse inter-ply seals 52 can be formed in a manner similar to the longitudinal inter-ply seals 18 and the transverse inter-ply seals 20 of the envelope 10. In alternative embodiments, one of the walls 46 can be formed from a single ply 48. As shown in FIG. 7, the plies 48 of each wall 46 define an inter-layer region in the form of an inter-ply space 49 therebetween.

The walls 46 are joined by longitudinal inter-wall seals 54 located at sides of the envelope 40 and depicted in FIG. 6, and by transverse inter-wall seals 56 located at the top and bottom of each wall 46 and depicted in FIG. 7. The longitudinal inter-wall seals 54 and the transverse inter-wall seals 56 can be formed in a manner similar to the longitudinal inter-wall seals 26 and the transverse inter-wall seals 28 of the envelopes 10.

The opposing walls 46 define the envelope pocket 47. As can be seen in FIG. 7, the slit 44 is formed in one of the walls 46, and provides access to the envelope pocket 47. The slit 44 is located directly below the transverse inter-ply seal 52 of the associated wall 46, i.e., the slit 44 is located directly to the left of the transverse inter-ply seal 52, from the perspective of FIG. 7. In alternative embodiments, the slit 44 can be offset from the transverse inter-ply seal 52 in the longitudinal direction. The slit 44 extends continuously over a substantial entirely of the width of the wall 46, but stops short of the longitudinal inter-ply seals 50 and the longitudinal inter-wall seals 54. In alternative embodiments, the slit 44 can be non-continuous, and/or can extend over a less than a substantial entirety of the associated wall 46.

A band of heat seal material 58 is disposed on an inwardly-facing surface of the inner ply 48 of each wall 46. The heat seal material 58 is disposed directly below the slit 44, on the wall 46 in which the slit 44 is formed. The heat seal material 58 is disposed on the other wall 46 so that the bands of heat seal material 58 oppose each other, as can be seen in FIG. 7. The heat seal material 58 can be offset longitudinally from the slit 44 in alternative embodiments.

As noted above, the envelope pocket 47 can receive an item to be packaged within the envelope 40. Due to the flexibility of the paper walls 46, the envelope 40 can be stored and shipped in a substantially flat, compact configuration in which the envelope pocket 47 has minimal, or substantially zero volume. When the user desires to load an item into the envelope 40, the user can expand the envelope pocket 47 by separating or pulling apart the walls 46 at or near the top of the envelope pocket 47, and inserting the item be packaged through the opening defined by the slit 44. Once the item has been placed in the envelope 40, the heat seal material 58 on both opposing walls 46 can be heated, and pressure can be applied to press the opposing bands of heat seal material 58 together, to form a pocket closure (not shown) that closes and seals the open end of the envelope pocket 47. In alternative embodiments, one band of adhesive covered by a release strip, or a pair of opposing bands of adhesive each covered by respective release strip, can be used in lieu of the heat seal material 58 to seal the opening to the envelope pocket 47.

The envelope 40 can be separated from the web stock 42 by cutting, severing, or tearing the envelope 40 from the web stock 42, along a line of separation denoted in FIGS. 5 and 7 by the line "$C_1$." The line of separation $C_1$ extends through the walls 46, the transverse inter-ply seals 52, and the transverse inter-wall seal 56. As can be seen in FIG. 7, the line of separation $C_1$ is longitudinally offset from the slit 44. Perforations, scoring, or other means for weakening the line of separation $C_1$ may be provided, to make it easier to separate the individual envelopes 40 from the web stock 42 without a need to cut or otherwise sever the envelope 40.

Once the envelope 40 has been separated from the web stock 42, the portions of the walls 46, the transverse inter-ply seals 52, and the transverse inter-wall seal 56 below the line of separation $C_1$, i.e., to the left of the line of separation $C_1$ from the perspective of FIG. 7, form the upper end of the envelope 40. The portions of the walls 46, the transverse inter-ply seals 52, and the transverse inter-wall seal 56 above the line of separation $C_1$, i.e., to the right of the line of separation $C_1$ from the perspective of FIG. 7, form the lower end of the adjacent envelope 40 which is still attached to the web stock 42.

Figure 8:
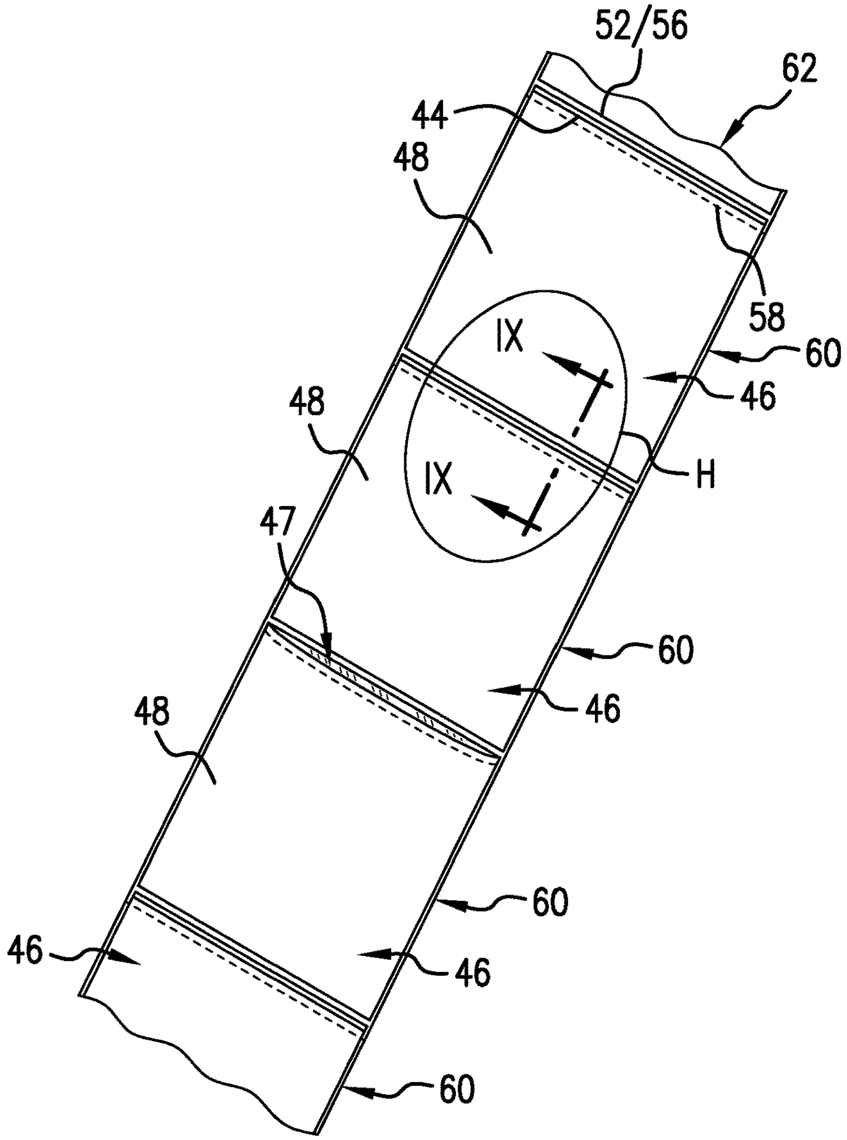
FIG. 8 depicts a continuous web stock of another embodiment of the envelope shown in FIG. 1.
Figure 9:
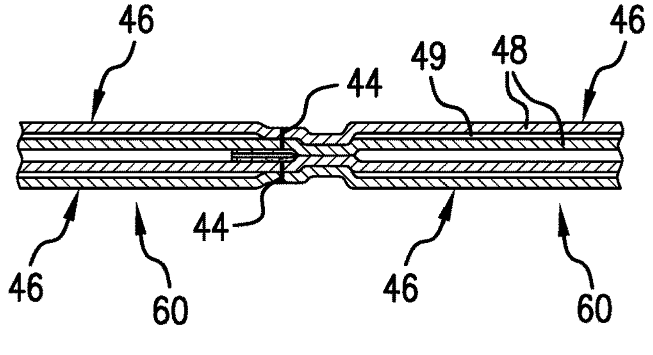
FIG. 9 is a magnified cross-sectional view through the plane "IX-IX" of FIG. 8.

FIGS. 8 and 9 depict another alternative embodiment in the form of an envelope 60. The envelopes 60 are depicted as part of a web stock 62 of adjoining envelopes 60. The envelopes 60 are substantially identical to the envelopes 40, with the below exception. Components of the envelopes 60 that are substantially identical to those of the envelopes 40 are referred to using identical reference characters.

Each envelope 60 has two of the slits 44, as opposed to the single slit 44 of the envelopes 40. Each slit 44 of the envelope 60 extends across a respective one of the walls 46 of the envelope 60, to provide access to the internal envelope pocket 47 of the envelope 40 from either side of the envelope 40.

Figure 10:
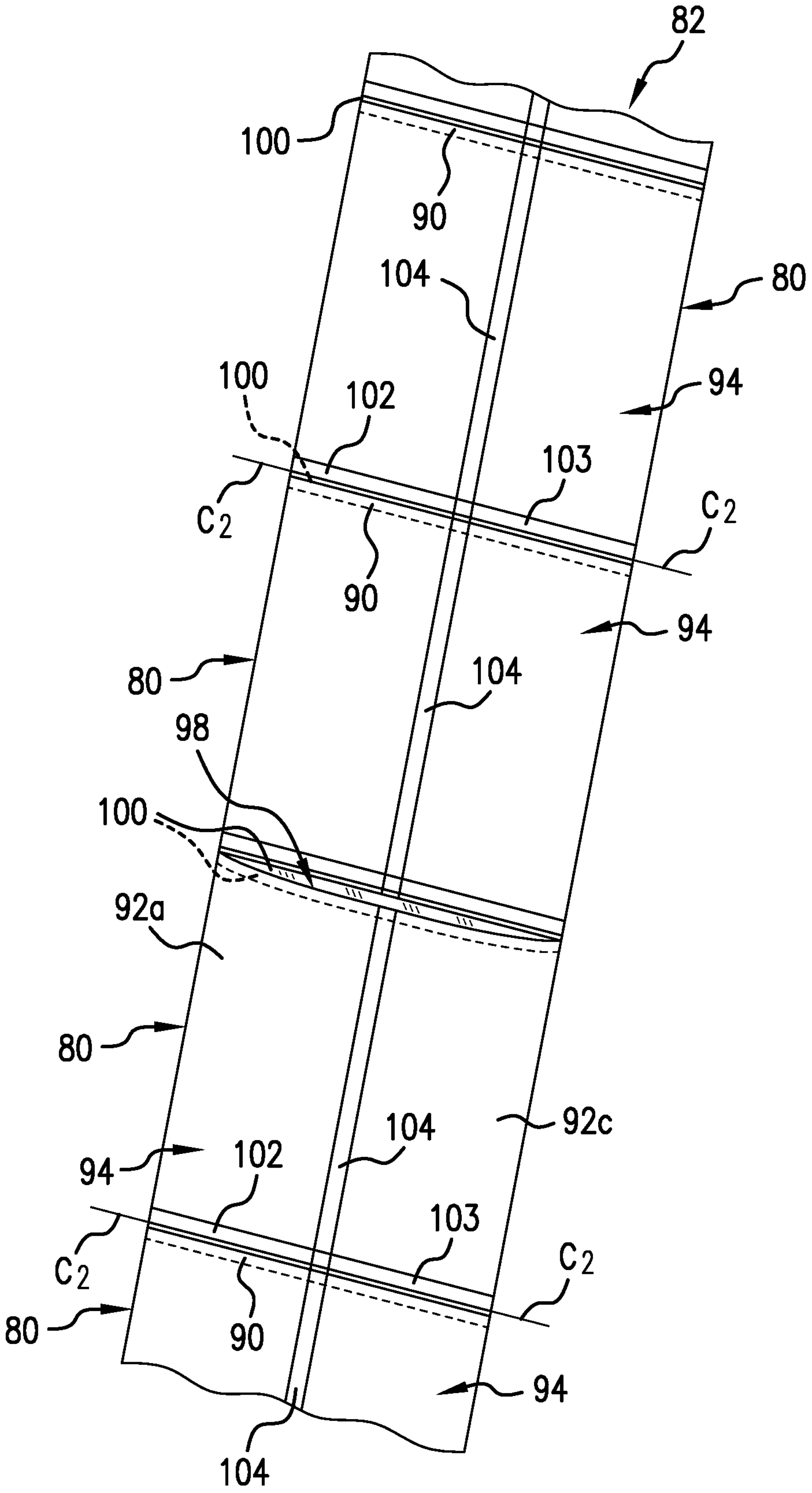
FIG. 10 depicts a continuous web stock of another embodiment of an envelope.
Figure 11:
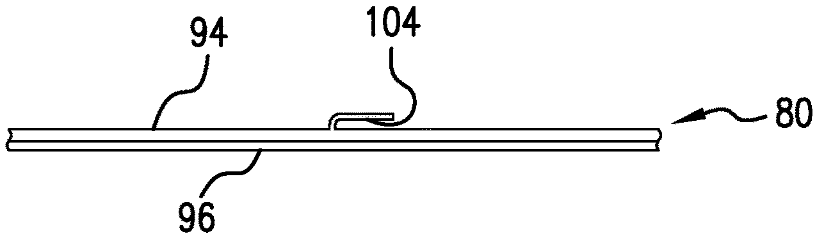
FIG. 11 is a top view of one of the envelopes shown in FIG. 10.
Figure 12:
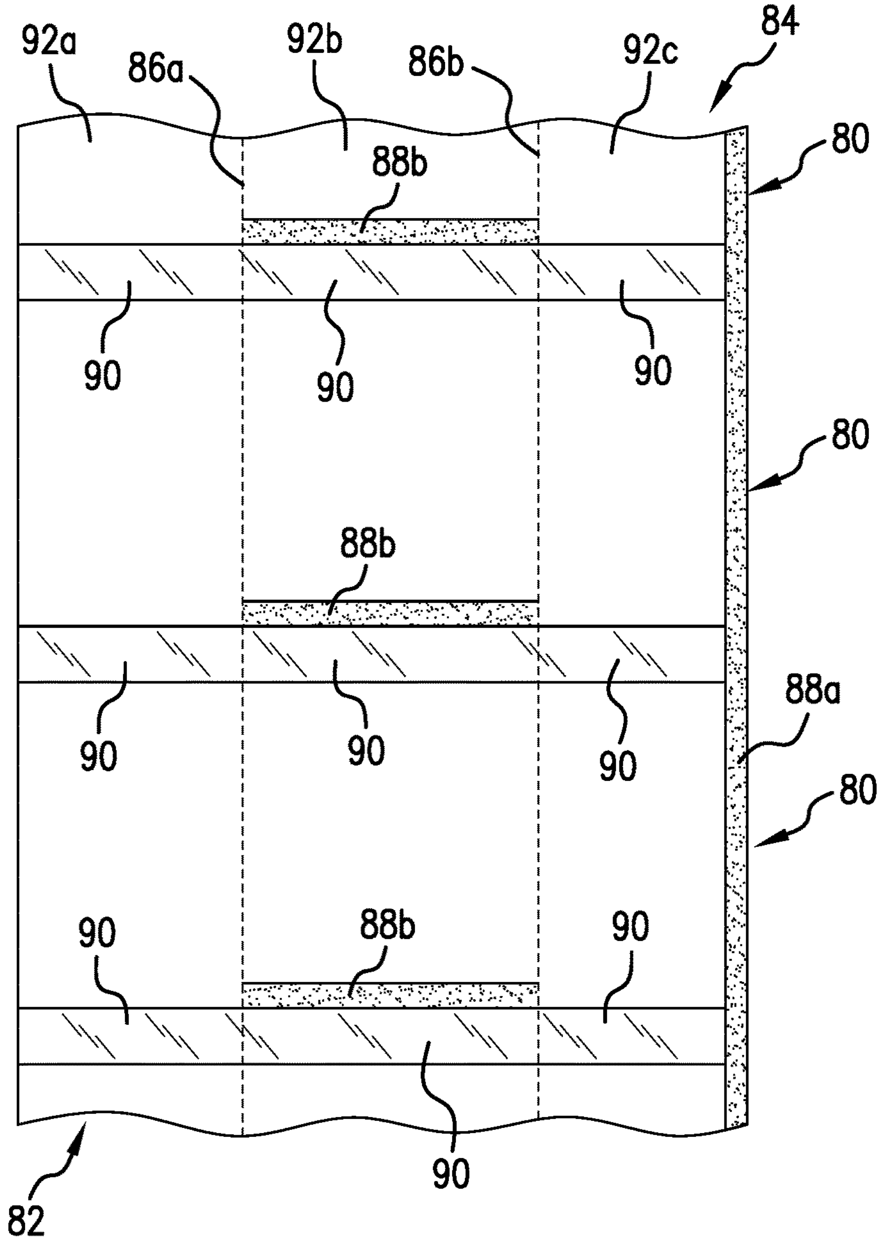
FIG. 12 depicts a continuous web of walls, in an unfolded state, used to form the container web stock shown in FIG. 10.

FIGS. 10-12 depict an embodiment of an envelope 80. The envelope 80 is depicted as part of a web stock 82 of the envelopes 80. The web stock 82 is formed from a two-ply web 84 depicted in FIG. 12. The web 84 comprises two plies of material joined by longitudinal and transverse inter-ply seals (not shown) so as to form an un-filled inter-layer region or inter-ply space between the plies, as discussed above in relation to the web 15 of the envelope 10.

The web stock 82 is formed from the web 84 by folding the web 84 along fold lines 86*a*, 86*b* denoted in FIG. 12. The fold lines 86*a*, 86*b* define a first segment 92*a* of the web 84 located to the left the fold line 86*a*; a second segment 92*b* located between the fold lines 86*a*, 86*b*; and a third segment 92*c* located to the right of the fold line 86*b*.

As can be seen in FIG. 12, an adhesive material 88*a* is disposed on an outer surface of the web stock 82, along a longitudinally-extending edge of the third segment 92*c*. Additional adhesive material 88*b* is disposed on the outer surface of the web stock 82, between the fold lines 86*a*, 86*b*. The adhesive material 88*b* extends in a transverse direction, and is positioned at multiple locations along the length of the web stock 82.

Also, heat seal material 90 is disposed on the outer surface of the web 84. The heat seal material 90 extends transversely, across the entire width of the web 84, and is located in part directly below the adhesive material 88*b*.

The web stock 82 of envelopes 80 is formed by folding the first segment 92*a* of the web 84 about the fold line 86*a*, and onto on the second segment 92*b*. The folding of the first segment 92*a* causes the first segment 92*a* to contact the adhesive material 88*b* on the second segment 92*b*, forming a transverse inter-wall seal 102 between the first and second segments 92*a*, 92*b*.

The third segment 92*c* of the web 84 subsequently is folded about the fold line 86*b*. The folding of the third segment 92*c* causes the third segment 92*c* to contact the adhesive material 88*b* on the second segment 92*b*, forming a transverse inter-wall seal 103 between the second and third segments 92*b*, 92*c*. The folding of the third segment 92*c* also causes the adhesive material 88*a* on the third segment 92*c* to contact a longitudinally-extending edge of the first segment 92*a*, forming a longitudinal inter-wall seal 104 between the first and third segments 92*a*, 92*c*.

The transverse and longitudinal inter-wall seals 102, 103, 104 affix the first, second, and third segments 92*a*, 92*b*, 92*c* to each other so that each envelope 80 within the web stock 82 retains the double-folded configuration depicted in FIG. 10. The first and third segments 92*a*, 92*c*, once joined, form a first wall 94 of the envelope 80. The second segment 92*b* forms an opposing second wall 96 of the envelope 80, visible in FIG. 11. The first and second walls 94, 96 define an internal containment area or envelope pocket 98 of the envelope 80.

A slit 100 is formed in the first wall 94, as shown in FIG. 10. The slit 100 is located directly above the heat seal material 90, i.e., the slit 100 is located between the heat seal material 90 and the adjacent transverse inter-wall seals 102, 103.

As discussed above in relation to the envelopes 10, an individual envelope 80 can be separated from the web stock 82 of envelopes 80 by cutting, severing, or tearing the envelope 80 from the web stock 82, with the separation being performed between the heat seal material 90 and the transverse inter-wall seals 102, 103 bordering the heat seal material 90. The line of separation of is denoted in FIG. 12 by the line "$C_2$." Means for weakening the line of separation $C_2$ may be provided, to make it easier to separate the individual envelopes 80 from the web stock 82 without a need to cut or otherwise sever the envelope 80.

As also discussed in relation to the envelope 10, when the user desires to load an item into the envelope 80, the user can expand the envelope pocket 98 by separating or pulling apart the first and second walls 94, 96 at or near the top of the envelope pocket 98, and inserting the item be packaged between the first and second walls 94, 96. Once the item has been placed in the envelope 80, the heat seal material 90 on the opposing first and second walls 94, 96 can be activated, i.e., heated and pressed together, so that the opposing bands of heat seal material 90, upon cooling, form a pocket closure (not shown). The pocket closure closes and seals the open end of the envelope pocket 98.

Alternative embodiments of the envelope 80 can be formed by folding the web 84 along a single fold line that divides the web 84 into two segments, so that the respective longitudinal edges of the two segments are joined by a longitudinal inter-wall seal; one of the segments forms an entirety of a first wall of the envelope; and a second of the segments forms an entirety an opposing second wall of the envelope.

Figure 13:
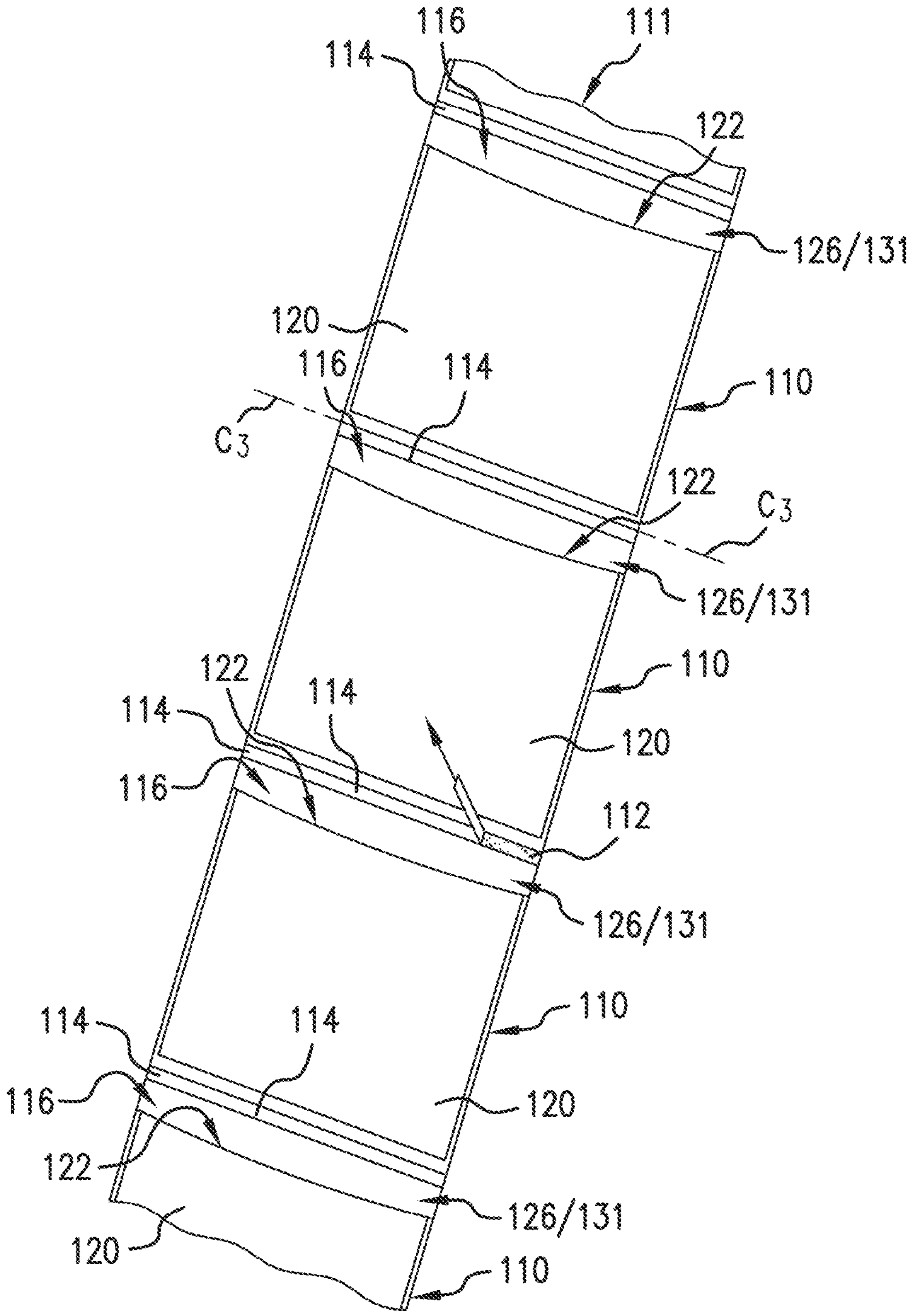
FIG. 13 depicts a continuous web stock of another embodiment of an envelope.

FIG. 13 depicts an envelope 110 that includes a transversely extending sealing strip 112, and an overlying release strip 114. The envelopes 110 are depicted as part of a web stock 111 of adjoining envelopes 110. The envelope 110 may be formed with the features of any of the above-described envelopes including, for example, the multi-ply walls, inter-ply seals, and inter-wall seals described above, with the following exceptions. The sealing strip 112 and the release strip 114 are provided in lieu of the heat-activated pocket closure of the above-described envelopes; and a cutout area 116 is formed in the envelope 110 in lieu of the slit that provides access to the envelope pocket in the above-described envelopes.

The cutout area 116 is provided by removing an upper portion of a wall 120 of the envelope 110. The cutout area 116 defines an opening 122 that provides access to an internal containment area or envelope pocket of the envelope 110. The cutout area 116 extends from the opening 122 to a cut line $C_3$ along which the envelope 110 is separated from an adjacent envelope 110 in the web stock 111.

The cutout area 116 exposes a portion of an inwardly facing surface of an opposing wall 126 of the envelope 110. The sealing strip 112 is disposed on the exposed portion of surface of the wall 126. The sealing strip 112 is depicted as being longitudinally offset from the opening 122. In alternative embodiments, the sealing strip 112 can border the opening 122.

The portion of the wall 126 exposed by the cutout area 116 forms a flap 131. After an item has been inserted into the envelope pocket of the envelope 110 through the opening 122, the release strip 114 can be removed from the sealing strip 112, and the flap 131 can be folded over, and onto the wall 120. The sealing strip 112 includes an adhesive material that causes the exposed sealing strip 112 to adhere to the wall 120, so that the flap 131 covers the opening 122. The sealing strip 112, alone or in combination with other sealing materials that may be disposed on the wall 120, forms a seal that functions similarly to the pocket closure in the above-described envelopes, to inhibiting access to the envelope pocket via the opening 122.

Figure 14:
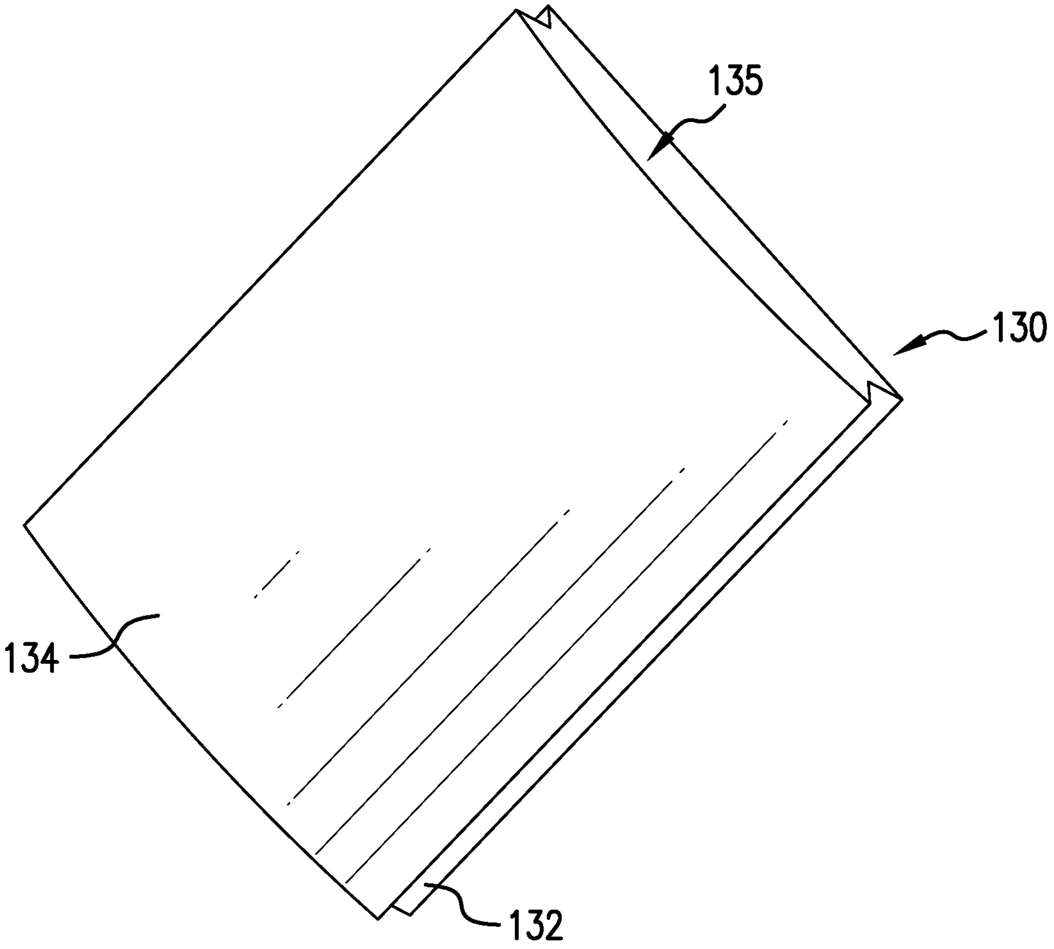
FIG. 14 is a perspective view of another embodiment of an envelope having gusseted sides.
Figure 15:
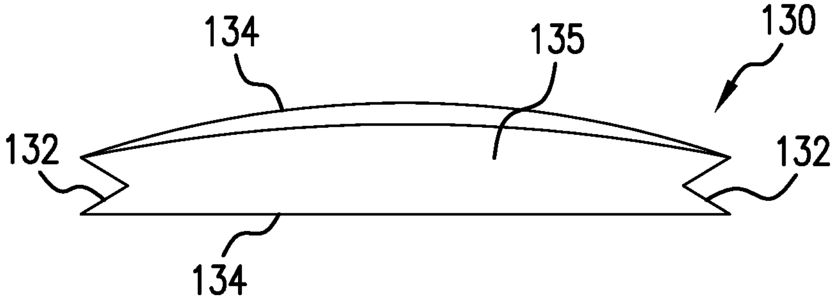
FIG. 15 is a top view of the envelope shown in FIG. 14.

FIGS. 14 and 15 depict an envelope 130 comprising gussets 132 positioned between opposing walls 134 of the envelope 130. The walls 134 define an internal containment area or envelope pocket 135 configured to receive an item to be shipped or otherwise held in the envelope 130. The envelope 130, and alternative embodiments thereof, otherwise can be formed with the features of any of the above-described envelopes including, for example, the multi-ply walls, inter-ply seals, and inter-wall seals described above. The gussets 132 have a folded configuration that permits the envelope 130 to expand substantially when, for example, an item is inserted into the internal envelope pocket 135 of the envelope 130.

Each gusset 132 can be formed as an integral part of one of the walls 134 of the envelope 130, and can be joined to the other wall 134 by one or more inter-wall seals as disclosed in relation to the above-described embodiments. In other embodiments, the gussets 132 can be formed separately from the walls 134, and can be joined to each of the opposing walls 134 the walls by the inter-wall seals.

Figure 16:
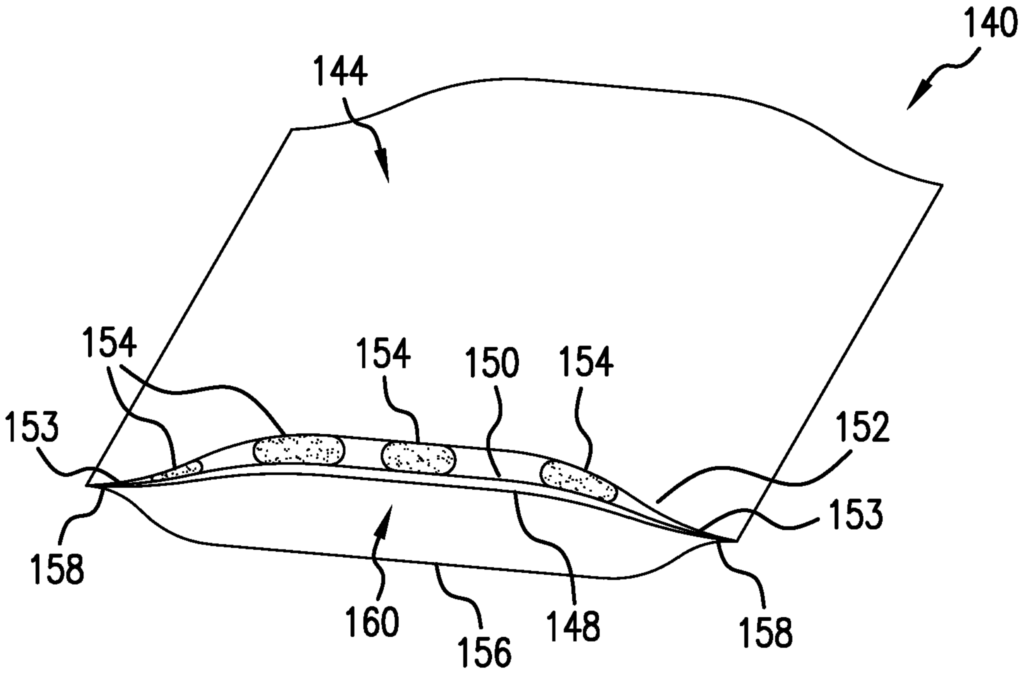
FIG. 16 is a transverse cross-sectional view of another embodiment of an envelope.

FIG. 16 depicts an envelope 140 that includes a multi-ply wall 144 configured as follows. The envelope 140 otherwise can include the features of one or more of the above-described envelopes. The wall 144 comprises a first ply 148, a second ply 150, and a third ply 152. The region between the first and second plies 148, 150 is substantially empty, with the exception of inter-ply seals 153 that join the first ply 148 to the second ply 150. The second ply thus can slide in relation to the first ply 148. The region between the second and third plies 150, 152 includes an expansion material 154 applied in an unexpanded condition to at least one of the second ply 150 and the third ply 152. The second and third plies 150, 152 and the expansion material 154 form another layer that can slide in relation to the first ply 148.

In alternative embodiments, the region between the first and second plies 148, 150 can include the expansion material 154 applied in an unexpanded condition to at least one of the first ply 148 and the second ply 150; and the region between the second and third plies 150, 152 can be substantially empty, with the exception of the inter-ply seals 153. In other alternative embodiments, the expansion material 154 can be disposed in both the region between the first and second plies 148, 150, and the region between the second and third plies 150, 152.

The envelope 140 further includes a single-ply wall 156 that opposes the wall 144, and its joined to the wall 144 by inter-wall seals 158. The walls 144, 156 define an internal containment area or envelope pocket 160 configured to receive an item to be held in the envelope 140. In alternate embodiments, the wall 156 can be a multi-ply wall, and can be configured with expansion material 154 in a manner similar to the wall 144.

The expansion material 154 is configured to assume an expanded configuration upon activation by an expansion initiator. The expansion initiator can be, for example, thermal, mechanical, and/or chemical, and/or can include other suitable initiating properties for activating the expansion material 154. Further discussion of expandable materials suitable for placement within the walls may be found in U.S. patent application Ser. No. 17/365,548, filed Jul. 1, 2021 and entitled "Packaging With Sealing Materials Having Different Sealing Conditions," the contents of which are incorporated by reference herein in their entirety. The expansion material, in its expanded state, provides a cushioning effect to the item within the envelope pocket 160.

Figure 17:
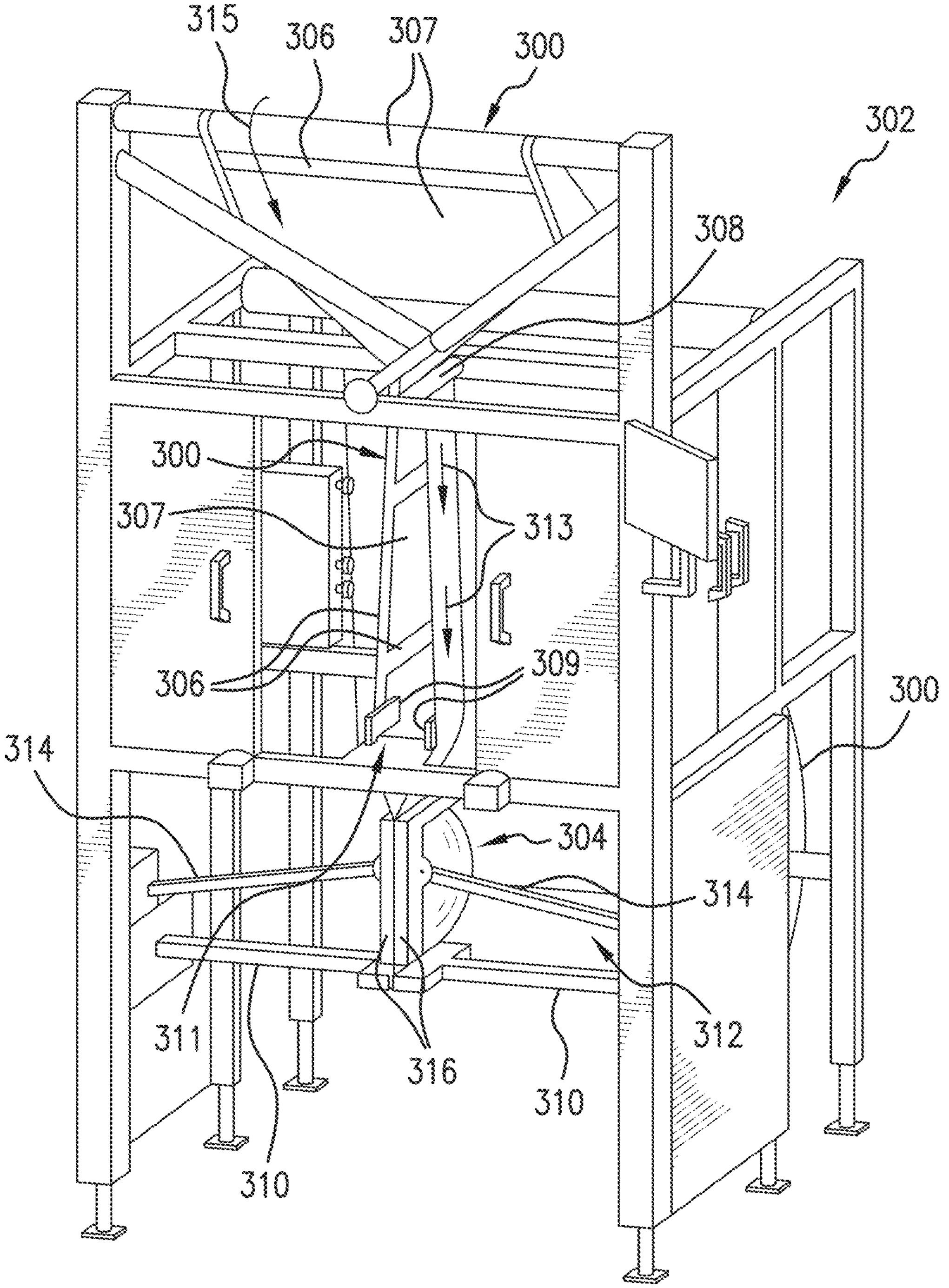
FIG. 17 is a perspective view of a bag maker configured to form another embodiment of an envelope.
Figure 18:
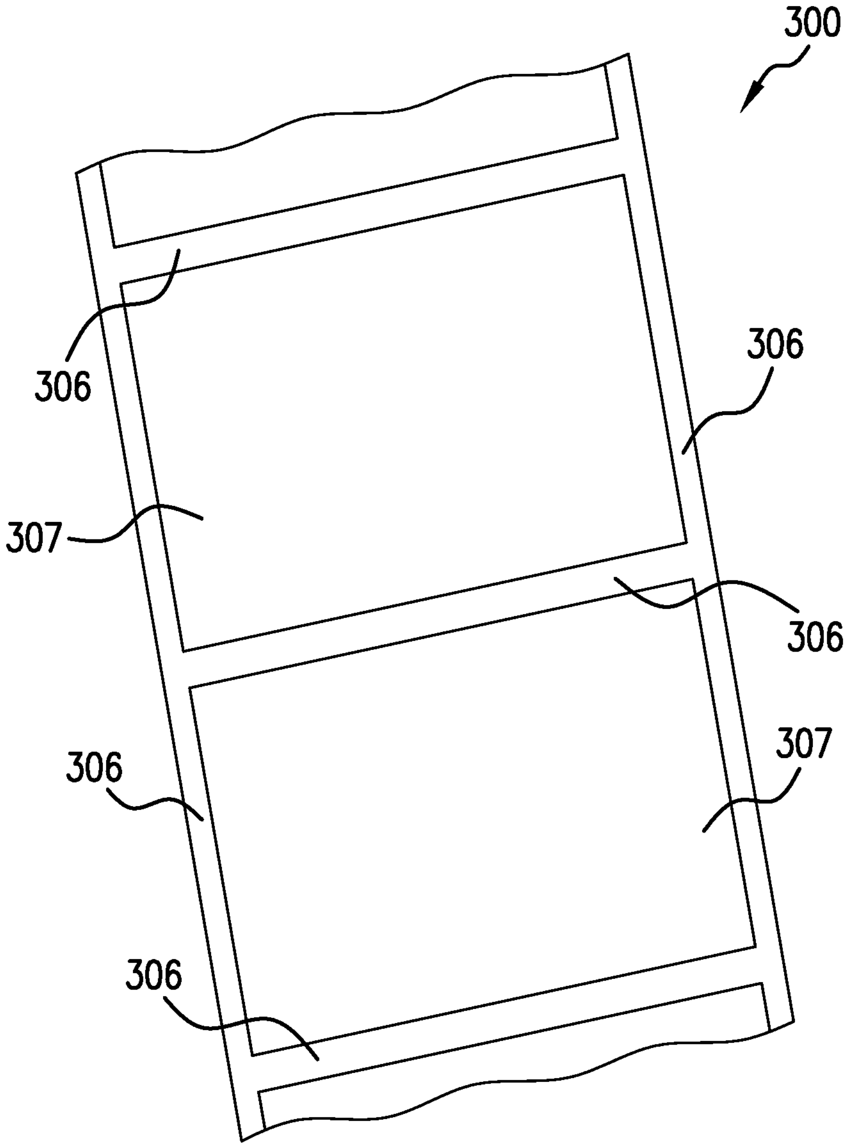
FIG. 18 is a perspective view of a web stock for use with the bag maker shown in FIG. 17.

FIG. 17 depicts a web stock 300 being formed into a C-folded envelope 304 by a bag maker 302. The web stock 300 is depicted by itself in FIG. 18, and has a two-layer configuration substantially identical to that of the web 15 from which the envelopes 10 are formed. Heat seal material 306 is disposed one side of the web stock 300 as depicted in FIG. 18, in lieu of the adhesive material 34 and heat seal material 31 that are disposed on the web 15 to produce the web stock 16 from which the envelopes 10 are formed. The heat seal material 306 is deposited on an outer surface of one of the plies 307 of the web stock 300. The heat seal material 306 is disposed in longitudinally-extending bands located along each side of the web stock 300, and in bands extending transversely between the longitudinally-extending bands.

The web stock 300 can be supplied as a roll mounted on the supply side of the bag maker 302, as depicted in FIG. 17. The web stock 300 can be supplied in other configurations, such as a fanfold supply configuration, in the alternative.

The web stock 300 is drawn through opposing guides or rollers 308 of the bag maker 302 in a manner that causes the web stock 300 to fold along a longitudinally extending fold line, which in turn causes the web stock 300 to assume a C-folded configuration. As can be seen in FIG. 17, when the web stock 300 is folded in this manner, the longitudinally-extending bands of heat seal material 306 on each side of the web stock 300 oppose each other; and the transversely-extending bands of heat seal material 306 fold inward upon themselves.

As the C-folded folded web stock 300 travels downward, as denoted by the arrows 313, opposing fingers 309 located in a loading area of the bag maker 302 spread the side edges of web stock 300 apart. This allows an item to be packaged to be inserted into the partially formed envelope 304, as denoted by the arrow 311. As discussed below, the transversely-extending band of heat seal material 306 at the bottom end of the web stock 300 had been activated during formation of the previous envelope 304, thus forms a lower transverse seal that prevents the item from falling downward after being loaded into the partially formed envelope 304.

The bag maker 302 includes two opposing arms 310 that reciprocate between an inward position, shown in FIG. 17, and an outward position (not shown). The arms 310 also translate between a lower position shown in FIG. 17, and an upper position (not shown). The arms 310 can grasp the lower end of the web stock 300, which coincides with the lower end of the partially-formed envelope 304, when arms 310 are in their inward and upper position. Subsequent downward movement of the arms 310 pulls the bottom end of the web stock 300, and the partially-formed envelope 304 downward to the position shown in FIG. 17. The movement of the bottom edge of the web stock 300 also causes the web stock 300 to advance through the bag maker 302. The web stock 300 can be moved by other means in alternative embodiments.

The bag maker 302 further includes a cutting and sealing unit 312 comprising two opposing arms 314 that reciprocate between an inward position, shown in FIG. 17, and an outward position (not shown). The cutting and sealing unit 312 also includes two L-shaped sealer-cutters 316 each mounted on an end of a respective one of the arms 314.

Once the arms 310 have drawn the bottom end of the web stock 300 and the partially-formed envelope 304 downward to the position shown in FIG. 17, the arms 314 of the cutting and sealing unit 312 move to their inward positions, bringing the sealer-cutters 316 into contact with the partially formed envelope 304.

The L-shaped configuration of the sealer-cutters 316 causes the sealer-cutters 316 to align with the longitudinally-extending bands of heat seal material 306 which, as noted above, oppose each other due the C-folded configuration of the web stock 300. The L-shaped configuration of the sealer-cutters 316 likewise causes the sealer-cutters 316 to align with the upper, transversely-extending band of heat seal material 306 which, as noted above, has been folded in upon itself due to the C-folded configuration of the web stock 300. The sealer-cutters 316 heat and press together the opposing heat-seal material 306, forming a longitudinally-extending seal along one side of the envelope 304, and transversely-extending seal along the top of the newly-formed envelope 304. As noted above, the transversely-extending seal along the bottom of the envelope 304 already had been formed during manufacture of the previous envelope 304.

Alternative embodiments of the bag maker 302 can include rollers to help draw the opposing sides of the web stock 300 together, to bring the longitudinally-extending bands of heat seal material 306 into contact with each other.

Once the longitudinal and transverse seals have been formed, the sealer-cutters 316 can sever the newly formed envelope 304 from the web stock 300 by a suitable means such as cutting, focused application of heat along the line of separation, pulling the envelope 304 away from the web stock 300, etc. Because the line of separation runs through the upper transversely-extending band of heat seal material 306, the portion of this band that remains on the web stock 300 after the cutting process forms the lower transverse seal for the next envelope 304 to be formed from the web stock 300.

The newly-formed and loaded envelope 304, upon being separated from the web stock 300, can drop onto a conveyor (not shown) or other means for transporting or holding the envelope 304.

The above description of the bag maker 302 is presented for illustrative purposes only. The C-folded envelope 304, and alternative embodiments thereof, can be formed using other type of bag makers.

Figure 19:
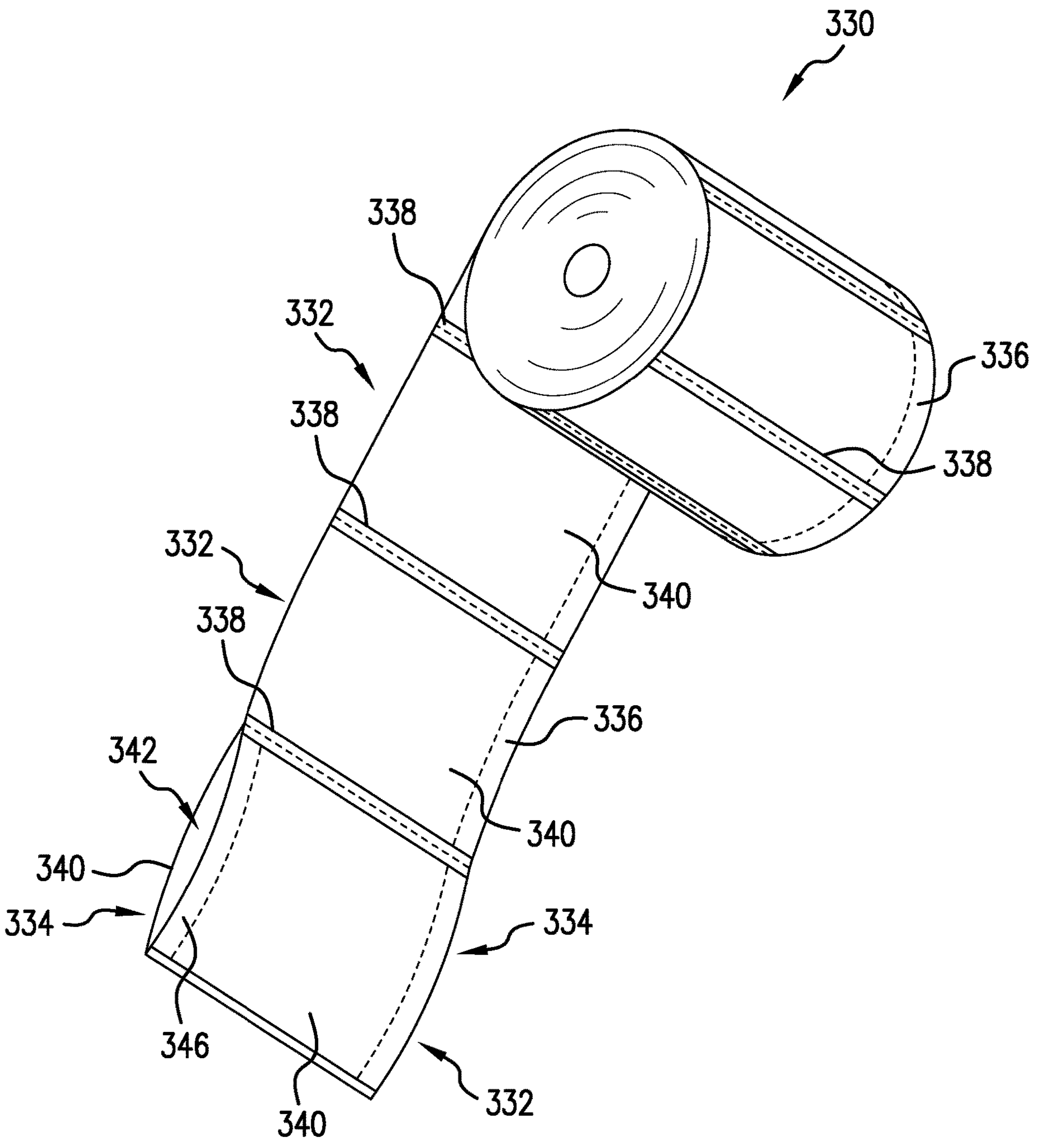
FIG. 19 is a perspective view of a web stock of side-loading envelopes.

FIG. 19 depicts a web stock 330 of side-loading envelopes 332. The web stock 330 is formed from two webs 334. Each web 334 has a two-layer configuration substantially identical to that of the web 15 from which the envelopes 10 are formed. The webs 334 are joined to form the web stock 330 by one longitudinal inter-wall seal 336 extending continuously along one side of the web stock 330, and by a plurality of transverse inter-wall seals 338 extending transversely across the web stock 330. Individual envelopes 332 are separated from the web stock 330 through lines of separation that pass through each transverse inter-wall seal 338.

Each individual envelope 332 within the web stock 330 includes two opposing walls 340 that define an envelope pocket 342 of the envelope 332. The end of the envelope pocket 342 on the unsealed side of the web stock 330 is open, so that an item to be packaged can be inserted into the envelope pocket 342 manually, or by an automated machine, as denoted by the arrow 344. Once the item has been inserted, heat seal material 346 located the inwardly-facing surface of one or both walls 340 can be activated, to seal the envelope pocket 342 and prevent the packaged item from exiting the envelope pocket 342.

Once the envelope pocket 342 has been sealed, the loaded envelope 332 can be severed from the web stock 330 by an appropriate means such as heating, the focused application of heat, pulling, etc.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. An envelope for holding an item, comprising:

a first flexible wall; and a second flexible wall overlying the first flexible wall and affixed to the first flexible wall about a containment border that encloses a plurality of sides of a containment region defined by the first and second flexible walls, which containment region is configured to contain the item, wherein:

the second flexible wall comprises at least two overlying layers of paper affixed to each other about an interlayer border that encloses a plurality of sides of an interlayer region defined by the at least two overlying layers of paper;

the at least two overlying layers of paper are unadhered to each other within at least a portion of the interlayer region; and the interlayer region is sufficiently empty so that the at least two overlying layers of paper abut each other over a majority of the interlayer region, such that the two overlying layers and the interlayer region are padding-free.

2. The envelope of claim 1, wherein the interlayer region overlies more than half of the containment region.

3. The envelope of claim 2, wherein the interlayer region overlies more than seventy-five percent of the containment region.

4. The envelope of claim 3, wherein the interlayer region overlies an entirety of the containment region.

5. The envelope of claim 1, wherein the at least two overlying layers of paper are slidable with respect to each other over a majority of the interlayer region.

6. The envelope of claim 1, wherein the containment region is accessible by way of an opening defined by the first and second flexible walls, and the envelope further comprises a bonding element disposed on at least one of the first and second flexible walls and configured to affix the first flexible wall to the second flexible wall to close the opening.

7. The envelope of claim 6, wherein the bonding element is a heat seal material.

8. The envelope of claim 1, wherein the first flexible wall comprises at least two overlying layers of paper affixed to each other about an interlayer border that encloses a plurality of sides of an interlayer region defined by the at least two overlying layers of paper of the first flexible wall.

9. The envelope of claim 8, wherein:

the first flexible wall comprises at least one inter-ply seal configured to affix the at least two overlying layers of paper of the first flexible wall to each other; and the at least one inter-ply seal defines at least a portion of the interlayer border.

10. The envelope of claim 9, further comprising at least one inter-wall seal configured to affix the first and second walls to each other, wherein the at least one inter-wall seal defines at least a portion of the containment border.

11. The envelope of claim 10, wherein:

the at least one inter-wall seal is a first inter-wall seal;

the envelope further comprises a second inter-wall seal;

the first inter-wall seal extends along respective first sides of the first and second flexible walls;

the second inter-wall seal extends along respective second sides of the first and second flexible walls;

the containment region is accessible by way of an opening defined by the first and second walls; and the opening extends between the first and second inter-wall seals.

12. The envelope of claim 1, wherein: the second flexible wall comprises at least a first, a second, and a third of the overlying layers of paper; the interlayer region is disposed between the first and second layers; and the envelope further comprises an expandable material disposed between the second and third layers.

13. A web stock comprising a plurality of the envelopes of claim 1, wherein each of the envelopes adjoins an adjacent one of the envelopes.

14. The web stock of claim 13, wherein each of the envelopes adjoins the adjacent one of the envelopes along a region of weakness between the adjacent envelopes.

15. The envelope of claim 1, wherein the second wall is free of padding.

16. The envelope of claim 1, wherein each of the overlying layers of paper is flat.

17. The envelope of claim 1, wherein the overlying layers of paper are formed from identical sheets of paper.

18. The envelope of claim 1, wherein the overlying layers of paper are smooth.

19. The envelope of claim 1, wherein the overlying layers of paper abut each other over an entirety of the interlayer region.

20. The envelope of claim 1, wherein the at least two overlying layers of paper are unadhered to each other within at least a majority of the interlayer region.

21. The envelope of claim 1, wherein the at least two overlying layers of paper are unadhered to each other within at least 75 percent of the interlayer region.

22. The envelope of claim 1, wherein the at least two overlying layers of paper are unadhered to each other within an entirety of the interlayer region.

23. The envelope of claim 1, wherein the portion of the interlayer region within which the at least two overlying layers of paper are unadhered overlies at least 25 percent of the containment region.

24. The envelope of claim 23, wherein the portion of the interlayer region within which the at least two overlying layers of paper are unadhered overlies at least 50 percent of the containment region.

25. The envelope of claim 24, wherein the portion of the interlayer region within which the at least two overlying layers of paper are unadhered overlies at least 75 percent of the containment region.

26. An envelope for holding an item, comprising:

a first flexible wall; and a second flexible wall overlying the first flexible wall and affixed to the first flexible wall about a containment border that encloses a plurality of sides of a containment region defined by the first and second flexible walls, which containment region is configured contain the item, wherein:

the second flexible wall comprises at least two smooth overlying layers of paper affixed to each other about an interlayer border that encloses a plurality of sides of an interlayer region defined by the at least two overlying layers of paper;

the at least two overlying layers of paper are unadhered to each other within at least a portion of the interlayer region;

the overlying layers of paper are formed from identical sheets of paper; and the interlayer region is sufficiently empty so that the at least two overlying layers of paper abut each other over a majority of the interlayer region.

27. An envelope for holding an item, comprising:

a first flexible wall; and a second flexible wall overlying the first flexible wall and affixed to the first flexible wall about a containment border that encloses a plurality of sides of a containment region defined by the first and second flexible walls, which containment region is configured to contain the item, wherein:

the second flexible wall is unpadded;

the second flexible wall comprises at least two overlying layers of un-embossed paper affixed to each other about an interlayer border that encloses a plurality of sides of an interlayer region defined by the at least two overlying layers of paper;

the at least two overlying layers of paper are unadhered to each other within at least a portion of the interlayer region overlying more than 25 percent of the containment area; and the interlayer region is sufficiently empty so that the at least two overlying layers of paper abut each other over a majority of the interlayer region.

* * * * *